(12) United States Patent
Ruike et al.

(10) Patent No.: US 7,763,113 B2
(45) Date of Patent: Jul. 27, 2010

(54) PHOTOCATALYST MATERIAL AND METHOD FOR PREPARATION THEREOF

(75) Inventors: Azuma Ruike, Aomori (JP); Takeshi Kudo, Aomori (JP); Yuko Nakamura, Aomori (JP); Kazuhito Kudo, Aomori (JP); Fumie Kawanami, Aomori (JP); Akira Ikegami, Kyoto (JP)

(73) Assignee: Andre Andes Electric Co., Ltd., Aomori (JP)

( * ) Notice: Subject to any disclaimer, the term of this patent is extended or adjusted under 35 U.S.C. 154(b) by 1043 days.

(21) Appl. No.: 10/481,204

(22) PCT Filed: Jun. 14, 2002

(86) PCT No.: PCT/JP02/05946

§ 371 (c)(1),
(2), (4) Date: Sep. 14, 2004

(87) PCT Pub. No.: WO02/102510

PCT Pub. Date: Dec. 27, 2002

(65) Prior Publication Data

US 2005/0070429 A1  Mar. 31, 2005

(30) Foreign Application Priority Data

Jun. 15, 2001 (JP) ............................. 2001-181969
Jun. 15, 2001 (JP) ............................. 2001-181970
Dec. 25, 2001 (JP) ............................. 2001-392804

(51) Int. Cl.
| | | |
|---|---|---|
| C30B 23/00 | (2006.01) | |
| C30B 25/00 | (2006.01) | |
| C30B 28/12 | (2006.01) | |
| C30B 28/14 | (2006.01) | |
| C30B 29/62 | (2006.01) | |
| C30B 29/66 | (2006.01) | |
| B31B 45/00 | (2006.01) | |
| B28B 11/00 | (2006.01) | |
| B28B 23/00 | (2006.01) | |
| D01F 9/12 | (2006.01) | |
| D01C 5/00 | (2006.01) | |
| C01G 25/02 | (2006.01) | |
| C01G 27/02 | (2006.01) | |
| C01G 23/04 | (2006.01) | |
| C01G 23/047 | (2006.01) | |
| B01J 23/00 | (2006.01) | |
| C23C 8/00 | (2006.01) | |
| C23C 22/00 | (2006.01) | |
| C23C 8/80 | (2006.01) | |
| C23C 8/06 | (2006.01) | |

(52) U.S. Cl. .................. 117/88; 117/920; 117/921; 117/924; 428/34.1; 428/34.4; 428/34.5; 423/447.1; 423/447.2; 423/447.3; 423/608; 423/609; 423/610; 502/349; 502/350; 148/240; 148/277; 148/281

(58) Field of Classification Search ............ 117/4, 117/8, 9, 88, 920, 921, 923, 924; 148/240, 148/277, 281; 423/447.1, 447.2, 608, 609, 423/610; 428/34.1, 34.4, 34.5; 502/249, 502/350

See application file for complete search history.

(56) References Cited

U.S. PATENT DOCUMENTS

| | | | | |
|---|---|---|---|---|
| 6,027,775 | A * | 2/2000 | Kasuga et al. | ........... 428/34.1 |
| 6,270,571 | B1 * | 8/2001 | Iwasaki et al. | ........... 117/88 |
| 2005/0070429 | A1 * | 3/2005 | Ruike et al. | ........... 502/350 |
| 2006/0105911 | A1 * | 5/2006 | Nakamura et al. | ........... 502/345 |

FOREIGN PATENT DOCUMENTS

| | | |
|---|---|---|
| EP | 0 832 847 A1 | 4/1998 |
| JP | 2000-317316 | 11/2000 |
| JP | 2001-131862 | 5/2001 |

OTHER PUBLICATIONS

Hippe et al. Platinum-filled oxidic nanotubes. Microporous and Mesoporous Materials 31 (1999) 235-239.*
Bower et al. Plasma-induced alignment of carbon nanotubes. Applied Physics Letters 77:6 (Aug. 7, 2000) 830-832.*

H. Imai, Y. Takei, K. Shimizu, M. Matsuda, and H. Hirashima, "Direct preparation of anatase TiO2 nanotubes in porous alumina membrane". J. Mater. Chem. 9, 2971 (1999). [ISI].*

* cited by examiner

*Primary Examiner*—Jerry Lorengo
*Assistant Examiner*—Jennifer A Smith
(74) *Attorney, Agent, or Firm*—Fay Sharpe LLP

(57) ABSTRACT

The present invention provides a photocatalyst material, which can comprise a photocatalyst with an excellent adherence to a substrate and a high photocatalytic activity, and a production method thereof. The photocatalyst material (20) obtained by reacting crystal nuclei with a sol solution containing an organic metallic compound or the like and then carrying out gelation, solidification and heat treatment has a structure where more than one basic structures (10) are fixed to the surface of the substrate (1). The basic structure consists of abase portion (2) comprising crystal nuclei fixed to the surface of the substrate (1) and a photocatalyst crystalline body (3), which connects to and is extended from the base portion (2) and has a columnar structure having a hollow portion (5) formed therein. A cylindrical substrate may be used for the substrate (1). The above photocatalytic activity is further enhanced by the formation of an interior-exposing structure (8) in a shell portion (4).

4 Claims, 8 Drawing Sheets

1 μm

100nm

PHOTOCATALYST MATERIAL AND METHOD FOR PREPARATION THEREOF

TECHNICAL FIELD

The present invention relates to a photocatalyst material and a production method thereof, and it particularly relates to a photocatalyst material for an oxide photocatalyst, which has a specific crystal form and shows a high photocatalytic activity, and a production method thereof.

BACKGROUND ART

An oxide photocatalyst (hereinafter referred to as a "photocatalyst") including titanium oxide as a typical example generates electrons at a conductor by photoexcitation, when it is irradiated with light at a wavelength of energy not less than its band gap. The oxide photocatalyst then generates holes in a balance band, so that it expresses a photocatalytic function. Thus, organic matter or nitrogen oxides, which come into contact with a photocatalyst, are decomposed into water or carbon dioxide gas by the strong reduction power of the electrons or the strong oxidative power of the holes. Accordingly, a photocatalyst has functions such as anti-fouling, deodorization or anti-bacterial properties. Environmental purification methods or devices, which utilize the anti-fouling, deodorizing and anti-bacterial functions of a photocatalyst, have become a focus of attention. In order to achieve the high performance and high efficiency of the photocatalyst, it is desired to enhance the photocatalytic activity of the photocatalyst itself.

Since the conventional photocatalyst material is generally used in a powdered state, it is extremely difficult to treat it, and accordingly, it is difficult to incorporate it into an environmental purification device. In order to fix a powder photocatalyst, there is a method which involves mixing a power photocatalyst with an organic binder, applying the mixture onto a substrate, and fixing it under ordinary temperature or by heating. However, this method has a disadvantage in that since the organic matter covers a small or large part of the surface of a photocatalyst, the photocatalytic function of the mixture significantly decreases as compared with that of the original powder photocatalyst. In addition, this method has another disadvantage in that since the organic binder as an organic matter is decomposed by the photocatalytic function, coating strength deteriorates, and powders thereby gradually fall away. The disadvantage regarding the detachment of powders has been overcome by the solidification of the powder photocatalyst with an inorganic binder. However, since the binder covers a part of the photocatalyst, the surface area that can be effectively used for the expression of the photocatalytic function decreases. Thus, the problem regarding the significant decrease of the photocatalytic function has not been overcome.

In order to solve the above problem of a powder photocatalyst, a large number of techniques for producing a photocatalyst such as the sol-gel method disclosed in Japanese Patent Laid-Open No. 10-180118 and others have been proposed in the past. Attempts have been made to solve the above described problems regarding a powder oxide photocatalyst and to improve its photocatalytic function. However, the satisfactory achievement of a high activity has not yet been obtained.

It is the object of the present invention to solve the problems of the above prior art techniques and to provide a photocatalyst material that can be used to achieve a photocatalyst with an excellent ability to adhere to a substrate as well as a high photocatalytic activity, and a production method thereof.

DISCLOSURE OF THE INVENTION

In order to achieve the above object, the present inventors have focused attention on achievement of a photocatalyst with a high activity by controlling its crystal form, and they have intensively studied the production of a photocatalyst by various production methods such as CVD (chemical vapor deposition) or PVD (physical vapor deposition), or by the sol-gel method of using an organic metallic compound or inorganic metallic compound. As a result, the present inventors have found that a photocatalyst with a high activity can be obtained by placing a crystal nucleus produced by various production methods such as CVD or PVD in a sol solution containing an organic metallic compound or inorganic metallic compound, or applying the sol solution to the crystal nucleus, and then carrying out solidification and heat treatment on the thus treated crystal nucleus, so that a titanium oxide crystal is made to grow from the crystal nucleus, thereby completing the present invention. That is to say, inventions within the scope of claims of the present application are as follows:

1. A photocatalyst material, characterized in that one or more than one columnar photocatalyst basic structure is fixed to the surface of a substrate, the above columnar photocatalyst basic structure consisting of a base portion comprising crystal nuclei that are to be fixed or are fixed to the surface of the substrate, and a columnar photocatalyst crystalline body that connects to and is extended from the base portion and has a columnar structure having a hollow portion formed therein.

2. The photocatalyst material according to 1 above, characterized in that the above base portion consists of crystal nuclei and the photocatalyst constituting the above columnar photocatalyst crystalline body is titanium oxide.

3. The photocatalyst material according to 2 above, characterized in that the above columnar photocatalyst crystalline body is formed by a shell portion consisting of a sidewall and an extension direction end and that it has a columnar shape such that a hollow portion is surrounded by the above shell portion, wherein the above shell portion is a polycrystalline body consisting of aggregated photocatalyst crystal grains.

4. The photocatalyst material according to 3 above, characterized in that the photocatalyst crystal grains (hereinafter referred to as "shell portion crystal grains" at times) constituting the above shell portion have a diameter between 2 nm and 50 nm and the above sidewall has a width between 20 nm and 100 nm in the extension direction.

5. The photocatalyst material according to any one of 2 to 4 above, characterized in that an aggregate of photocatalyst crystal grains (hereinafter referred to as a "hollow portion polycrystalline body" at times) is produced in the hollow portion that is formed inside the above columnar photocatalyst crystalline body.

6. The photocatalyst material according to 5 above, characterized in that the photocatalyst crystal grains constituting the above hollow portion polycrystalline body (hereinafter referred to as a "hollow portion polycrystalline body grains") have a diameter between 2 nm and 50 nm.

7. The photocatalyst material according to any one of 2 to 6 above, characterized in that the above crystal nucleus is any one selected from a group consisting of a powder, a single crystal, a polycrystalline body, a ceramic, a crystallized glass, a thermally-oxidized metal film, and an anodically-oxidized metal film.

8. The photocatalyst material according to any one of 2 to 6 above, characterized in that the above crystal nuclei are in the form of a crystalline titanium oxide film formed by chemical vapor deposition (hereinafter referred to as "CVD" at times) or physical vapor deposition (hereinafter referred to as "PVD" at times).

9. The photocatalyst material according to 7 or 8 above, characterized in that the above crystal nucleus has a diameter between 1 nm and 350 nm.

10. The photocatalyst material according to any one of 2 to 9 above, characterized in that it comprises a columnar photocatalyst basic structure where the above columnar photocatalyst crystalline body extends in the same direction along the growth direction of the above crystal nuclei.

11. A method for producing a photocatalyst material, characterized in that it comprises:
   a gelation step of immersing a substrate, to which crystal nuclei are fixed for use as a base portion of a columnar photocatalyst basic structure, in a sol solution comprising an organic metallic compound or inorganic metallic compound, or applying the sol solution comprising an organic metallic compound or inorganic metallic compound to the above crystal nuclei fixed to the above substrate, so as to obtain a prototype of a photocatalyst material by gelation;
   a solidification step of drying and solidifying the above prototype obtained by the above gelation step; and
   a heat treatment step of subjecting the solidified prototype to heat treatment so as to form a columnar photocatalyst crystalline body,
   so that the photocatalyst material according to any one of 1 to 10 above is obtained.

12. The photocatalyst material according to any one of 2 to 10 above, which comprises one or more than one columnar photocatalyst basic structure fixed to the surface of a substrate, the above columnar photocatalyst basic structure consisting of a base portion comprising crystal nuclei that are to be fixed to or are fixed to the surface of the substrate and a columnar photocatalyst crystalline body that connects to and is extended from the base portion and has a columnar structure having a hollow portion formed therein,
   characterized in that the surface of the above substrate to which the above base portion is fixed is a curved surface convex on the side of the extension direction of the above columnar photocatalyst crystalline body.

13. The photocatalyst material according to 12 above, characterized in that the above substrate is a cylindrical substrate having a radius of 50 µm or shorter.

14. The photocatalyst material according to 12 or 13 above, characterized in that the material of the above substrate is anyone selected from a group consisting of a glass, a ceramic, a metal, and a metal oxide.

15. A method for producing a photocatalyst material, characterized in that it comprises:
   a gelation step of using a substrate whose surface to which the above base portion is to be fixed is a curved surface convex on the side of the extension direction of the above columnar photocatalyst crystalline body, or a cylindrical substrate having a radius of 50 µm or shorter, fixing crystal nuclei for use as the above base portion of the above columnar photocatalyst basic structure to the above substrate, immersing the substrate, to which the above crystal nuclei are fixed, in a sol solution comprising an organic metallic compound or inorganic metallic compound, or applying the sol solution comprising an organic metallic compound or inorganic metallic compound to the above crystal nuclei fixed to the above substrate, so as to obtain a prototype of a photocatalyst material by gelation;
   a solidification step of drying and solidifying the above prototype obtained by the above gelation step; and
   a heat treatment step of subjecting the solidified prototype to heat treatment so as to form the above columnar photocatalyst crystalline body,
   so that the photocatalyst material according to any one of 12 to 14 above is obtained.

16. The photocatalyst material according to any one of 12 to 14 above, which comprises one or more than one columnar photocatalyst basic structure fixed to the surface of a substrate, the above columnar photocatalyst basic structure consisting of a base portion comprising crystal nuclei that are to be fixed to or are fixed to the surface of a substrate and a columnar photocatalyst crystalline body that connects to and is extended from the base portion and has a columnar structure having a hollow portion formed therein,
   characterized in that the shell portion of the above columnar photocatalyst crystalline body has an interior-exposing structure to expose an internal structure that is the hollow portion of the above columnar photocatalyst crystalline body.

17. A method for producing a photocatalyst material, which comprises a gelation step of immersing a substrate, to which crystal nuclei are fixed for used as a base portion of a columnar photocatalyst basic structure, in a sol solution comprising an organic metallic compound or inorganic metallic compound, or applying the sol solution comprising an organic metallic compound or inorganic metallic compound to the above crystal nuclei fixed to the above substrate, so as to obtain a prototype of a photocatalyst material by gelation,
   a solidification step of drying and solidifying the above prototype obtained by the above gelation step, and a heat treatment step of subjecting the solidified prototype to heat so as to form the above columnar photocatalyst crystalline body,
   characterized in that ion etching or other types of dry etching is carried out on the above columnar photocatalyst crystalline body obtained by the above heat treatment step, so as to obtain the photocatalyst material according to 16 above.

18. A method for producing a photocatalyst material comprising the above gelation step, the above solidification step, and the above heat treatment step, characterized in that wet etching is carried out on the above columnar photocatalyst crystalline body obtained by the above heat treatment step, and the above columnar photocatalyst crystalline body is treated with an etching solution that acts to dissolve titanium oxide, so as to obtain the photocatalyst material according to 16 above.

19. A method for producing a photocatalyst material comprising the above gelation step, the above solidification step, and the above heat treatment step, characterized in that the above columnar photocatalyst crystalline body obtained by the above heat treatment step is further subjected to a polishing treatment or other treatments to mechanically eliminate a part of the above shell portion, so as to obtain the photocatalyst material according to 16 above.

20. A method for producing a photocatalyst material comprising the above gelation step, the above solidification step, and the above heat treatment step, characterized in that, in the above heat treatment step, heat treatment is carried out at a temperature increase rate of from 15° C./min to 105° C./min, so as to obtain the photocatalyst material according to 16 above.

That is to say, as a basic structure, the photocatalyst material of the present invention consists of titanium oxide crystals each having a columnar hollow structure that is made to grow from a base portion such as a crystal nucleus fixed to a substrate, and thereby obtaining a high photocatalytic activity. In addition, there is used a substrate whose surface to which a crystal nucleus is fixed is curved surface, such as a cylindrical substrate. Moreover, the hollow portion of the titanium oxide crystal is exposed outside, so that a higher photocatalytic activity is obtained.

In the present invention, the term "columnar" regarding the form of the photocatalyst crystalline body includes all of prismatic, cylindrical and styloid structures, and other columnar types of three-dimensional structures. Moreover, the term "columnar crystal" includes a crystal that directly extends in the vertical direction, a crystal that extends obliquely, a crystal that extends while curving, a crystal that extends while being divided to some branches, a crystal obtained by fusion of several columnar crystals during their growth, and other crystals.

The crystal nucleus is not limited to those prepared by sputtering method, PVD such as vacuum deposition, or CVD, but the type of the crystal nucleus includes all of a single crystal, a polycrystalline body, a powder, a ceramic, a thermally-oxidized metal film, and an anodically-oxidized metal film. Moreover, herein, the crystal nucleus may also include one that is not clearly recognized as a nucleus, differing from those observed in common chemical reactions. For example, a portion that is on a base plate and is different from the state of the base plate may be used as an alternative to the nucleus, and examples of such a portion include flaws or foreign projections on the base plate. The columnar crystal structure is characterized in that it allows one or more columnar crystals to grow on the crystal nucleus, and that both the crystal nucleus and the columnar crystal that grows thereon grow in the same direction and the columnar crystal has a hollow structure therein. As compared with the previous photocatalysts having other crystal structures, a photocatalyst having a columnar crystal structure has a better contact efficiency with an object to be decomposed, and it thereby has remarkably improved decomposition ability.

The above titanium oxide crystal is obtained by placing a crystal nucleus in a sol solution containing an organic metallic compound or inorganic metallic compound, or applying the sol solution to the crystal nucleus, and then carrying out solidification and heat treatment, so as to allow the crystal to grow from the crystal nucleus. The titanium oxide crystal having a columnar hollow structure is extremely active. When dry etching or other means are carried out on the titanium oxide crystal, so as to eliminate a part of the shell portion of the columnar hollow crystal or to reduce the density of the crystal constituting the shell portion, the hollow portion structure of the columnar hollow crystal is exposed and the surface area (specific surface area) of the photocatalyst increases, so that a photocatalyst with a higher activity can be obtained.

Reference codes used in each figure denote the following: 1, 41, 51 . . . substrate (basal plate), 2, 42, 52 . . . baseportion (crystal nucleus), 3, 43, 53 . . . columnar photocatalyst crystalline body (titanium oxide crystals with a columnar hollow structure), 4, 54 . . . shell portion, 5, 55 . . . hollow portion, 6, 56 . . . hollow portion polycrystalline body (aggregate of crystal grains of hollow crystal), 8 . . . interior-exposing structure, 10, 60 . . . columnar photocatalyst basic structure, 20, 70 . . . photocatalyst material, 31 . . . gelation step, 32 . . . solidification step, 33, 34 . . . heat treatment step, 35 . . . interior-exposing structure formingstep (dryetching), 36 . . . interior-exposing structure forming step (wet etching), 37 . . . interior-exposing structure forming step (mechanical method), S1 . . . crystal nucleus, S2 . . . sol solution, M3 . . . prototype of photocatalyst material, M4 . . . immobilized prototype, M5 . . . photocatalyst material without interior-exposing structure, P5, P6 . . . photocatalyst material

BEST MODE FOR CARRYING OUT THE INVENTION

The present invention will be explained in detail below with reference to figures.

Figure 1:
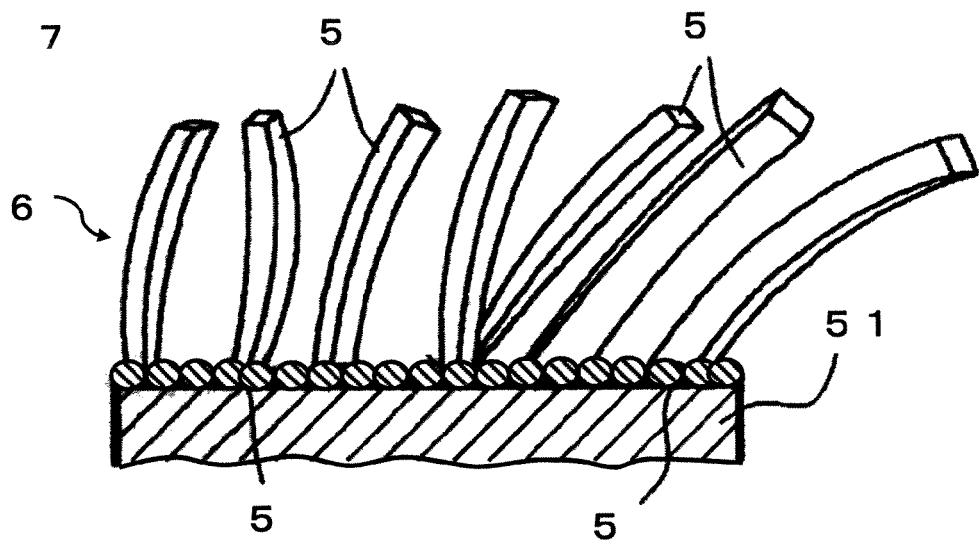
FIG. 1 is a schematic diagram showing the appearance of the photocatalyst material of the present invention.

FIG. 1 is a schematic diagram showing the appearance of the photocatalyst material of the present invention. In the figure, a photocatalyst material 70 has a main structure such that one or more than one columnar photocatalyst basic structure(s) 60 are fixed to the surface of a substrate 51, the columnar photocatalyst basic structure 60 consisting of a base portion 52 such as a crystal nucleus that is to be fixed or is fixed to the surface of the substrate 51, and a columnar photocatalyst crystalline body 53 that connects to and is extended from the base portion 52 and has a columnar structure having a hollow portion formed therein (claim 1 in the scope of claims). Herein, the forms of the columnar photocatalyst crystalline body 53 include a prismatic crystal form, a cylindrical crystal form, a branched arborescent crystal form, a form obtained by fusion of several columnar crystals during their growth, and other forms.

In the figure, in the photocatalyst material 70 of the present invention, the above base portion 51 can be a crystal nucleus, and the photocatalyst constituting the above columnar photocatalyst crystalline body 53 can be titanium oxide (claim 2 in the scope of claims).

Figure 2:
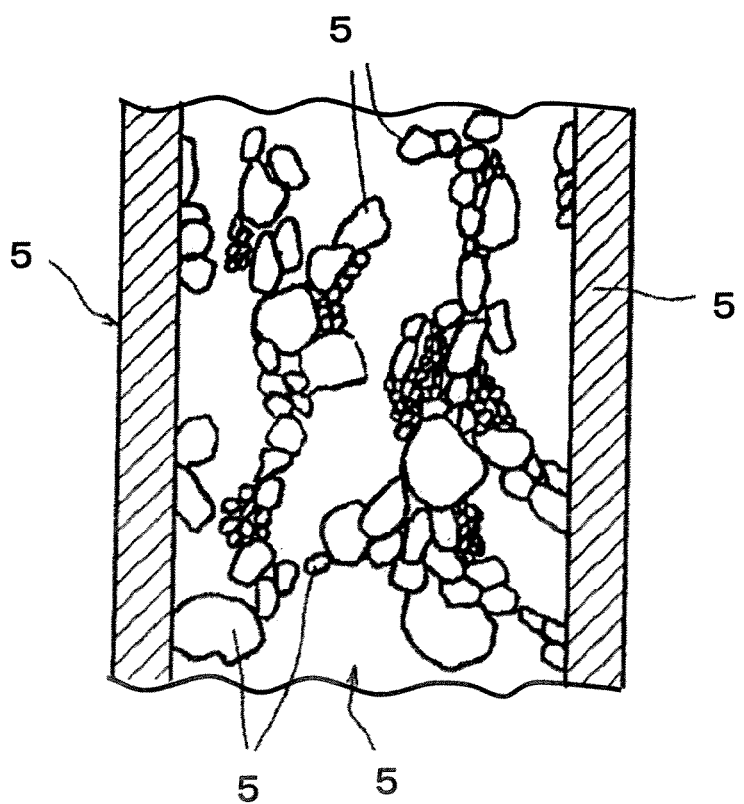
FIG. 2 is a schematic diagram showing a longitudinal section obtained by enlargement of a portion of the photocatalyst material of the present invention.

FIG. 2 is a schematic diagram showing a longitudinal section obtained by enlargement of a portion of the photocatalyst material of the present invention. In the figure, the columnar photocatalyst crystalline body 53 of the photocatalyst material 70 is formed by a shell portion 54 consisting of a sidewall and an extension direction end that is not shown in the figure, and it has a columnar shape such that a hollow portion 55 is surrounded by the above shell portion 54, wherein the above shell portion 54 is a polycrystalline body consisting of aggregated photocatalyst crystal grains (claim 3 in the scope of claims).

A typical photocatalyst material of the present invention is characterized in that the photocatalyst crystal grain (hereinafter referred to as a "shell portion crystal grain") constituting the above shell portion 54 has a diameter between 2 nm and 50 nm, and that the above sidewall has a width between 20 nm and 100 nm in the extension direction (claim 4 in the scope of claims). However, a few photocatalyst materials of the present invention are not within the above range.

In a typical photocatalyst material of the present invention, a crystal aggregate constituting the shell portion 54 has a width between approximately 20 nm and 100 nm in the extension direction (the width of the shell portion 54), but needless to say, several photocatalyst materials of the present invention are not within this range.

Moreover, in some cases, the shell portion 54 of the titanium oxide crystal with a columnar hollow structure is constituted by the aggregation of columnar crystals thinner than the above range. In this case, the columnar crystal constituting the shell portion 54 has a width in the extension direction or diameter between approximately 2 nm and 50 nm.

In FIG. 2, the columnar photocatalyst crystalline body 53 of the photocatalyst material 70 of the present invention has a structure such that a hollow portion polycrystalline body 56 that is an aggregate of photocatalyst crystal grains is formed in the hollow portion 55 formed inside the above columnar photocatalyst crystalline body (claim 5 in the scope of claims). The crystal grain of the hollow portion polycrystalline body that is a photocatalyst crystal grain constituting the above hollow portion polycrystalline body 56 has a diameter between approximately 2 nm and 50 nm.

Figure 3:
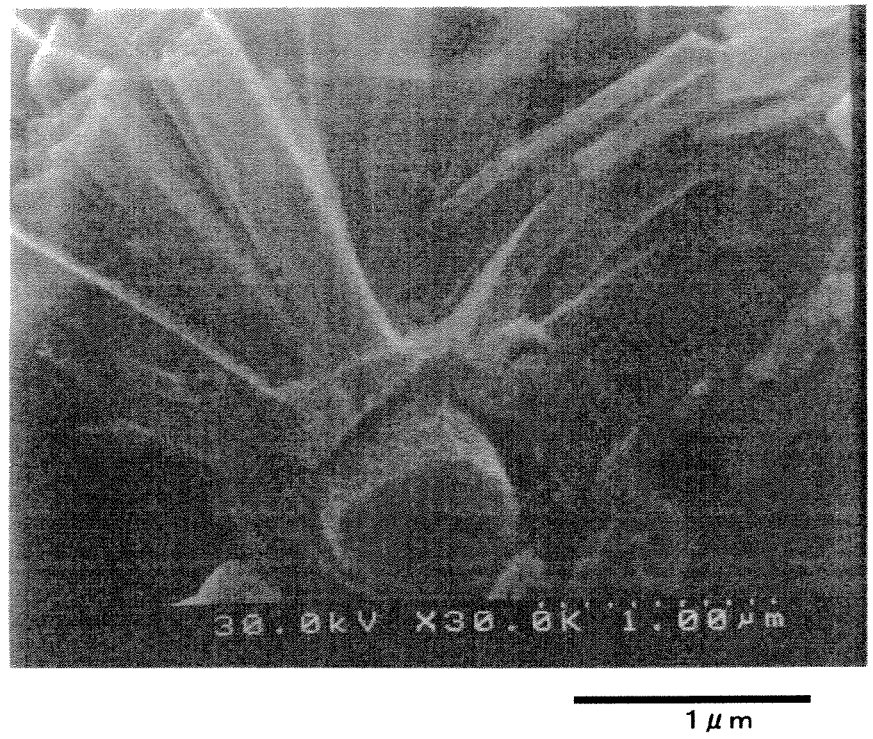
FIG. 3 is a scanning electron micrograph showing an example of the photocatalyst material of the present invention.
Figure 4:
FIG. 4 is a transmission electron micrograph showing a longitudinal section obtained by enlargement of a portion of the columnar photocatalyst crystalline body of the photocatalyst material of the present invention.

FIG. 3 is a scanning electron micrograph showing an example of the photocatalyst material of the present invention, and FIG. 4 is a transmission electron micrograph showing a longitudinal section obtained by enlargement of a portion of the columnar photocatalyst crystalline body of the photocatalyst material of the present invention. In FIG. 3, the columnar photocatalyst crystalline body of the present invention extends from a base portion formed on a cylindrical substrate so as to form a columnar photocatalyst basic structure, and thus, the photocatalyst material of the present invention is formed by the above substrate and the multiple columnar photocatalyst basic structures.

In FIG. 4, the photocatalyst crystalline body (53) of the present invention (hereinafter referred to as a "columnar hollow crystal" at times) has the shell portion (54) and the hollow portion (55) surrounded thereby. In the hollow portion (55), it can be confirmed that crystal grains are present at a low density so as to form the hollow portion polycrystalline body (56). The hollow portion polycrystalline body (56) is formed by aggregation of hollow portion polycrystalline body grains (diameter: approximately 5 nm to 50 nm) whose grain diameter is generally greater than that of crystals constituting the shell portion 54. In some rare cases, columnar hollow crystals in which no hollow portion polycrystalline body (56) is formed are observed. However, the ratio is extremely low.

In the photocatalyst material of the present invention, a crystal nucleus may be anyone selected from a group consisting of a powder, a single crystal, a poly crystalline body, a ceramic, a crystallized glass, a thermally-oxidized metal film, and an anodically-oxidized metal film (claim 7 in the scope of claims). The crystal nucleus may be a crystalline titanium oxide film formed by CVD or PVD (claim 8 in the scope of claims). In addition, the crystal nucleus may have a diameter between 1 nm and 350 nm (claim 9 in the scope of claims).

The columnar hollow crystal 53 in the present invention is grown from the crystal nucleus 52, and it can be formed using a sol solution containing an organic metallic compound or inorganic metallic compound. Generally, when a sol solution not containing a substance that is to be a crystal nucleus is applied onto the substrate 51 followed by solidification and heat treatment, a titanium oxide crystal is formed in a powdered state, but a columnar crystal such as in the present invention is not formed.

In contrast, to produce the photocatalyst material of the present invention, any one of a single crystal, a polycrystalline body, a powder, a ceramic, a thermally-oxidized metal film, and an anodically-oxidized metal film is used as the crystal nucleus 52, and the crystal nucleus is placed in a sol solution containing an organic metallic compound or inorganic metallic compound, or the sol solution is applied to the crystal nucleus, followed by solidification and heat treatment, so that the columnar hollow crystal 53 is grown from the crystal nucleus 52, and thus, the photocatalyst material of the present invention can be obtained.

Moreover, a crystal film is formed on the substrate 51 by CVD or PVD, and using this film as the crystal nucleus 52, the columnar hollow crystal 53 can be grown by the same method as described above.

The crystal nucleus making the columnar photocatalyst crystalline body (columnar hollow crystal) 53 grows desirably has a size between 1 nm and 350 nm for the following reason. That is, if the crystal nucleus is smaller than 1 nm, the size of the crystal nucleus is too small, and therefore, a titanium oxide crystal growing thereon might grow without influence of the crystal nucleus. On the other hand, if the size is greater than 350 nm, the crystal nucleus is too coarse, and therefore, a titanium oxide crystal growing thereon likewise might grow without influence of the crystal nucleus. That is to say, the size of the crystal nucleus that is effective to obtain the columnar hollow crystal of the present invention is 1 nm to 350 nm.

The photocatalyst material of the present invention is characterized in that it has the columnar photocatalyst basic structure 60 in which the above columnar photocatalyst crystalline body 53 extends in the same direction along the growth direction of the above crystal nucleus 52 (FIG. 1, claim 10 in the scope of claims). The ratio of the columnar photocatalyst basic structure 60 having the same extension direction along the growth direction of the above crystal nucleus 52 with respect to the total columnar photocatalyst basic structures is not particularly limited, and a photocatalyst material in which the total columnar photocatalyst basic structures substantially show the above character is naturally also included. In the photocatalyst material 70 of the present invention, the crystal nucleus 52 placed on the substrate 51 is able to grow longitudinally toward the surface of the substrate 51 by the above PVD or the like, and thereby the columnar photocatalyst basic structure 60 is also able to grow longitudinally toward the surface of the substrate 51. Thus, as compared with the conventional powder photocatalyst crystal, the photocatalyst material of the present invention has an increased exposed area of the surface of the photocatalyst contributing to photocatalytic functions, thereby achieving a high photocatalytic activity.

Figure 5:
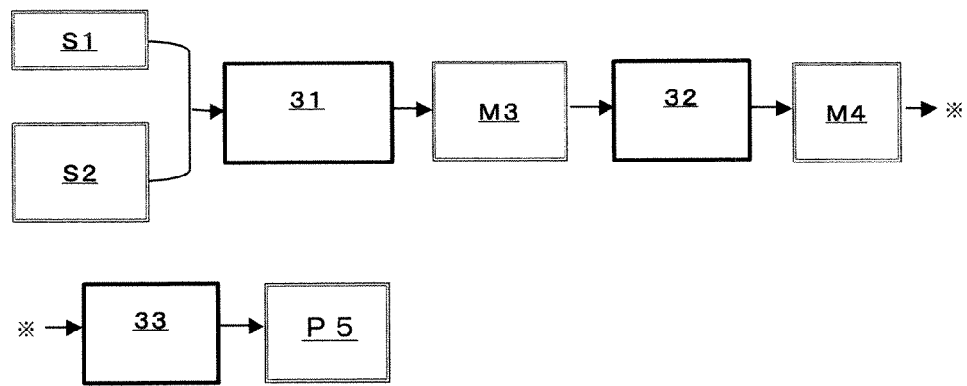
FIG. 5 is a flow diagram showing the method for producing a photocatalyst material of the present invention.

FIG. 5 is a flow diagram showing the method for producing a photocatalyst material of the present invention. In the figure, the production method for obtaining the above photocatalyst material P5 (70) is mainly configured such that it comprises: a gelation step 31 of immersing the above substrate 51, to which the crystal nucleus S1 (52) used as a base portion of the above columnar photocatalyst basic structure 60 is fixed, in a sol solution S2 containing an organic metallic compound or inorganic metallic compound, or applying the sol solution S2 containing an organic metallic compound or inorganic metallic compound to the above crystal nucleus S1 (52) fixed to the above substrate 51, so as to obtain a prototype M3 of a photocatalyst material by gelation; a solidification step 32 of immobilizing the above prototype M3 obtained by the above gelation step 31 by drying; and a heat treatment step 33 of subjecting the immobilized prototype M4 to heat treatment, so as to form the above columnar photocatalyst crystalline body 53 (claim 11 in the scope of claims).

As stated above, various types of crystal nucleus can be used as the crystal nucleus 52, and examples include a powder, a single crystal, a polycrystalline body, a ceramic, a crystallized glass, a thermally-oxidized metal film, and an anodically-oxidized metal film, which are produced by various production methods such as CVD or PVD. As stated above, the diameter of the crystal nucleus is desirably 350 nm or shorter.

Solidification in the solidification step 32 may be a treatment to simply dry by heating, or other heating substances may be added. Otherwise, gelation may occur by addition of water. The present invention is not limited by such immobilizing means.

Figure 6:
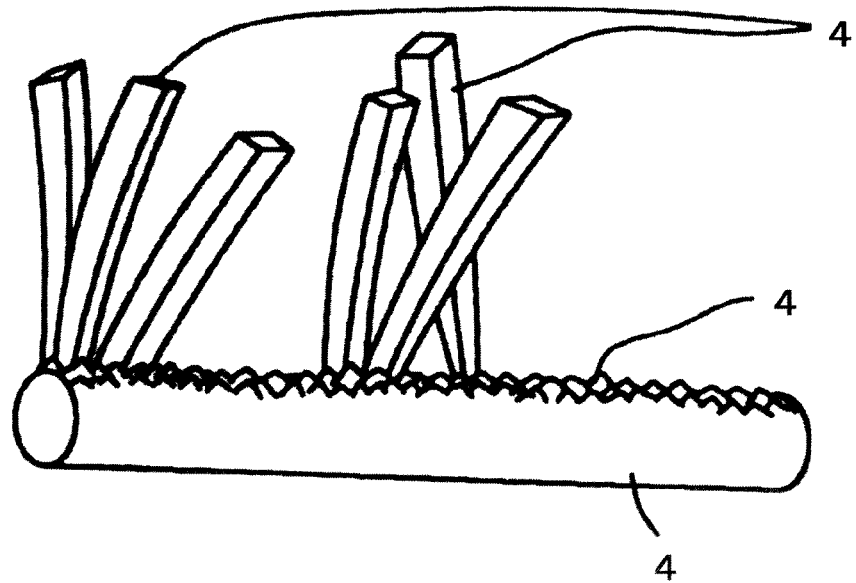
FIG. 6 is a schematic diagram showing the appearance of the photocatalyst material of the present invention, in which a cylindrical substrate is used.

FIG. 6 is a schematic diagram showing the appearance of the photocatalyst material of the present invention, in which a cylindrical substrate is used. In the figure, the photocatalyst material of the present invention using a cylindrical substrate is mainly configured such that it consists of one or more than one columnar photocatalyst basic structure(s) fixed to the surface of a substrate 41, the above columnar photocatalyst basic structure consisting of a base portion 42 such as a crystal nucleus that is to be fixed to or is fixed to the surface of the substrate 41 and a columnar photocatalyst crystalline body 43, which connects to and is extended from the base portion 42 and has a columnar structure having a hollow portion formed therein, and that the surface of the above substrate 41 to which the above base portion 42 is fixed is a curved surface that is a convex on the side of the extension direction of the above columnar photocatalyst crystalline body (claim 12 in the scope of claims).

In the figure, in the photocatalyst material using the cylindrical substrate, the above substrate 41 may be a cylindrical substrate having a radius of 50 μm or shorter (claim 13 in the scope of claims). Moreover, the material of the above substrate 41 may be any one of a glass, a ceramic, a metal, and a metal oxide (claim 14 in the scope of claims).

That is to say, a cylindrical substrate is used as the substrate 41 forming the columnar photocatalyst crystalline body 43, and the radius of the substrate is set to 50 μm or shorter, so that as compared with the case of using a substrate with a flat surface, the columnar photocatalyst crystalline body 43 is formed at an extremely high density, thereby realizing an unprecedented high photocatalytic activity.

It has been confirmed that a columnar crystal is formed even using a flat glass substrate, metal substrate, or horn fibrous substrate. However, in these cases, a few number of columnar crystals are formed. In contrast, in the photocatalyst material of the present invention in which crystals are grown on a curved surface, a larger number of columnar crystals (columnar photocatalyst crystalline bodies) are formed. In particular, in the case of using a cylindrical substrate, the smaller the diameter, the more the columnar crystals that can be formed. When a cylindrical substrate with a radius of 50 μm or shorter is used, columnar crystals are formed at a high density, and thus, the obtained photocatalyst material has a higher photocatalytic activity than the photocatalyst material using the above substrates with a flat surface such as a glass or metal.

Figure 7:
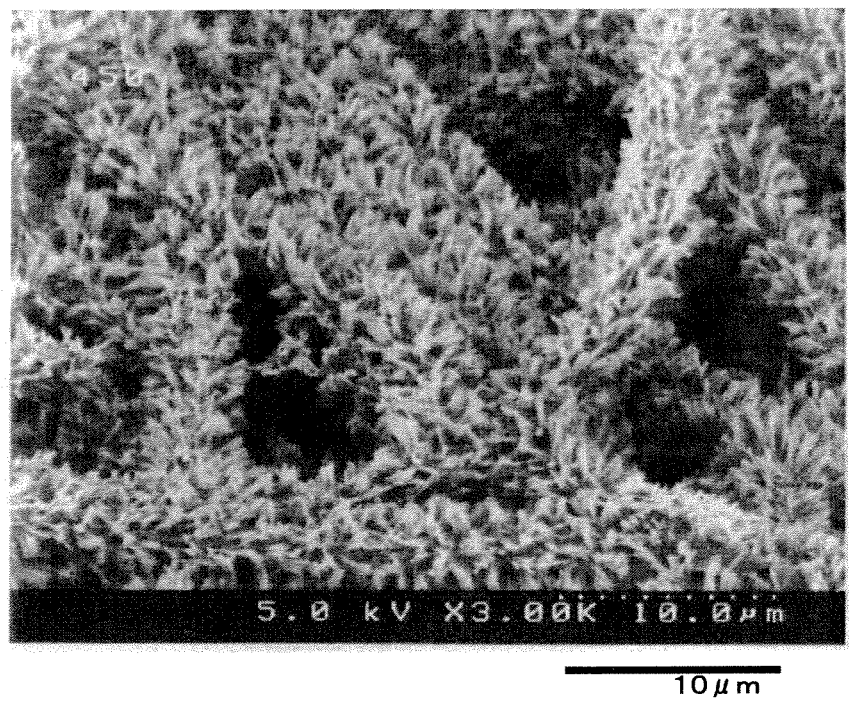
FIG. 7 is a scanning electron micrograph showing an example of the photocatalyst material of the present invention, in which a cylindrical substrate is used.

FIG. 7 is a scanning electron micrograph showing an example of the photo catalyst material of the present invention, in which a cylindrical substrate is used. From the figure, it is observed that a large number of columnar crystals (columnar photocatalyst crystalline bodies 43) are formed at a high density from the substrate (41).

In order to obtain a high photocatalytic activity, it is important to increase the occasion that a photocatalyst comes into contact with a toxic substance that is the target to be decomposed. That is to say, the increase of the surface area of the photocatalyst has a great influence on the achievement of a high photocatalytic activity. In the multiple laminated structure of the cylindrical substrate 41 with a radius of 50 μm or shorter on which the columnar photocatalyst crystalline bodies 43 are formed at a high density, the columnar photocatalyst crystalline bodies 43 are formed at a high density on the substrate 41, thereby increasing the exposed area of the surface of the photocatalyst contributing to photocatalytic functions. Moreover, since the substrate itself has a multiple laminated structure, as compared with a substrate with a flat surface, the surface area of the photocatalyst increases, thereby achieving a high photocatalytic activity.

The photocatalyst material of the present invention using a substrate with a nonflat surface such as a cylindrical substrate can be produced by the following steps. That is to say, the production method comprises: a gelation step of using a substrate whose surface to which the above base portion is fixed is a curved surface that is a convex on the side of the extension direction of the above columnar photocatalyst crystalline body 43, or the cylindrical substrate 41 having a radius of 50 µm or shorter, fixing the crystal nucleus 42 used as a base portion of the above columnar photocatalyst basic structure to the above substrate 41, immersing the substrate 41, to which the above crystal nucleus 42 is fixed, in a sol solution comprising an organic metallic compound or inorganic metallic compound, or applying the sol solution comprising an organic metallic compound or inorganic metallic compound to the above crystal nucleus 42 fixed to the above substrate 41, so as to obtain a prototype of a photocatalyst material by gelation; a solidification step of immobilizing the above prototype obtained by the above gelation step by drying; and a heat treatment step of subjecting the immobilized prototype to heat treatment, so as to form the above columnar photocatalyst crystalline body 43 (claim 15 in the scope of claims).

Figure 8:
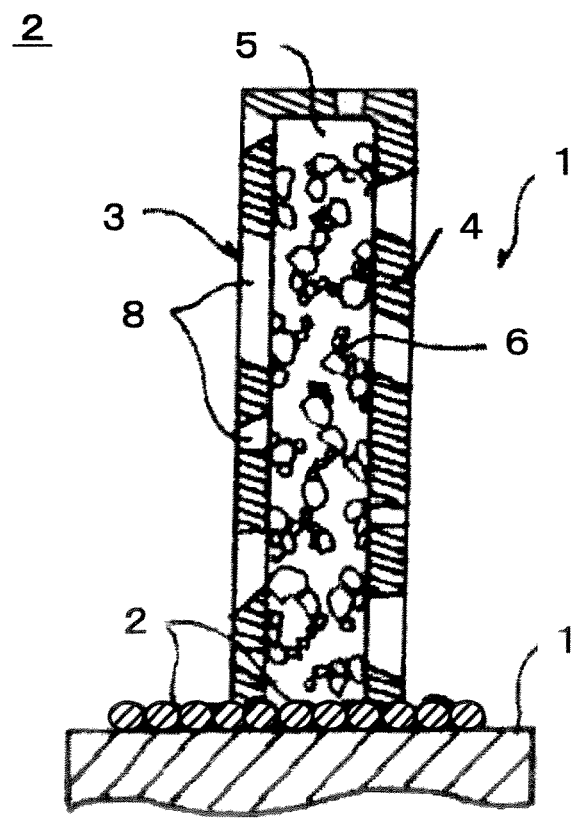
FIG. 8 is a schematic diagram showing a longitudinal section of the photocatalyst material of the present invention having an interior-exposing structure.

FIG. 8 is a schematic diagram showing a longitudinal section of the photocatalyst material of the present invention having an interior-exposing structure. In the figure, the photocatalyst material 20 of the present invention is mainly configured such that it consists of one or more than one columnar photocatalyst basic structure(s) 10 fixed to the surface of a substrate 1, the above columnar photocatalyst basic structure 10 consisting of a base portion 2 such as a crystal nucleus that is to be fixed to or is fixed to the surface of the substrate 1 and a columnar photocatalyst crystalline body 3, which connects to and is extended from the base portion 2 and has a columnar structure having a hollow portion 5 formed therein, and that a shell portion 4 of the above columnar photocatalyst crystalline body 3 has an interior-exposing structure 8 to expose an internal structure that is the hollow portion 5 of the above columnar photocatalyst crystalline body 3 (claim 16 in the scope of claims).

The shell portion 4 is a shell structure of the above columnar photocatalyst crystalline body 3 that is a columnar hollow structure, and it is a shell structure corresponding to the sidewall of a column. However, the shell portion 4 is not limited to the above shell structure, but it also includes a shell structure corresponding to the edge on the extension (growth) direction side. Accordingly, the above interior-exposing structure 8 is present at least either one of the shell portion corresponding to the sidewall and the shell portion corresponding to the edge, or it may also be formed on both the shell portions. In the present invention, the interior-exposing structure 8 can be formed on at least the shell portion 4 corresponding to the sidewall.

The above interior-exposing structure 8 is formed by eliminating a part of the above shell portion 4 or by constituting the shell portion 4 at a low density. The above interior-exposing structure 8 has a function to expose an internal structure (hollow portion polycrystalline body 6) with a photocatalytic function that is present in the above hollow portion 5, so as to express the photocatalytic function. When an internal structure having a photocatalytic function such as a perforation, crack, cut portion, excised portion or the like is present in the above hollow portion 5, the interior-exposing structure 8 includes all the structures to expose the internal structure so as to make it exert the photocatalytic function.

Titanium oxide can be used for the above columnar photocatalyst crystalline body 3, and a crystal nucleus that makes the columnar photocatalyst crystalline body 3 grow can be used for the above base portion 2. In addition, it can be configured that the hollow portion polycrystalline body 6 consisting of an aggregate of photocatalyst particles is formed in the above hollow portion 5.

In FIG. 8, the columnar photocatalyst basic structure 10 having a columnar hollow structure of the present invention is fixed to the surface of the substrate 1 in the base portion 2. A part of the shell portion 4 is eliminated by the interior-exposing structure 8 located on the shell portion 4 of the columnar photocatalyst crystalline body 3 growing from the base portion 2, or the shell portion 4 is formed at a low density, so that an internal structure existing in the hollow portion 5 is exposed outside. In other words, when an internal structure having a photocatalytic function is present in the hollow portion 5, the internal structure can exert the photocatalytic function. Accordingly, the surface area of the columnar photocatalyst basic structure 10 is increased, thereby achieving a high photocatalytic activity. Moreover, since it can be configured such that the hollow portion polycrystalline body 6 consisting of photocatalyst particles is present in the hollow portion 5, the surface area of the columnar photocatalyst basic structure 10 is further increased, thereby achieving a further higher photocatalytic activity.

Figure 9:
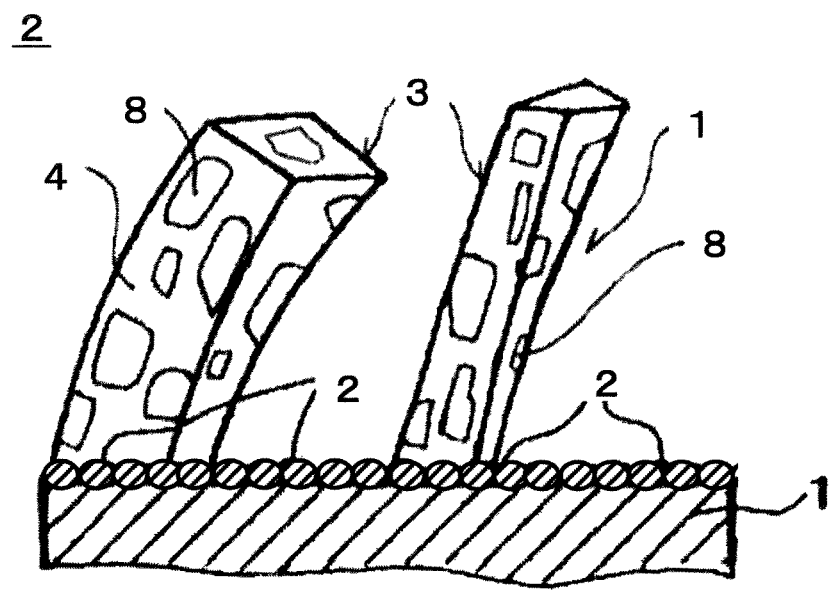
FIG. 9 is a schematic diagram showing the appearance of the photocatalyst material of the present invention having an interior-exposing structure.

FIG. 9 is a schematic diagram showing the appearance of the photocatalyst material of the present invention having an interior-exposing structure. In the figure, the substrate 1 can be made from various materials such as a glass, metal, ceramic, or fiber with a cancellous structure, and various types of basal plates with a shape such as a flat plate, shell, or cylinder can be used for the substrate.

In the figure, the photocatalyst material 20 of the present invention consists of the substrate 1 and the columnar photocatalyst basic structure 10 carried on the substrate 1 at the base portion 2.

Figure 10:
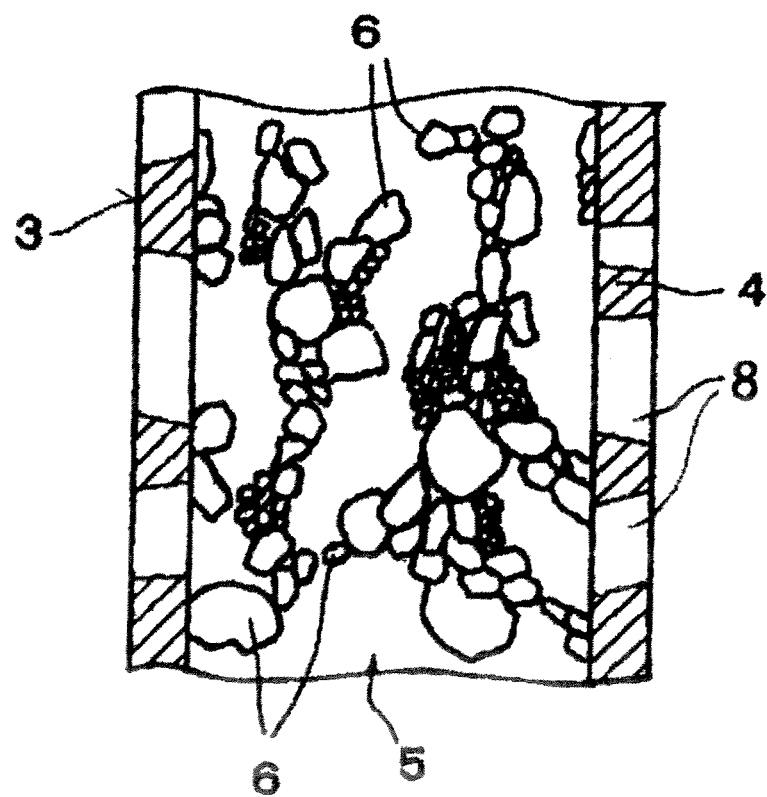
FIG. 10 is a schematic diagram showing a longitudinal section obtained by enlargement of a portion of the photocatalyst material of the present invention having an interior-exposing structure.

FIG. 10 is a schematic diagram showing a longitudinal section obtained by enlargement of a portion of the photocatalyst material of the present invention having an interior-exposing structure. In the figure, the internal structure of a columnar photocatalyst crystalline body 3 is a structure located in a hollow portion 5 surrounded by a shell portion 4, in which crystals are bound with one another at a high density and an interior-exposing structure 8 having a function to expose the above internal structure outside is formed. The internal structure has a structure such that a hollow portion polycrystalline body 6 that is an aggregate consisting of multiple photocatalyst particles with different diameters is formed at a lower density than the hollow portion polycrystalline body in the shell portion 4.

In the shell portion 4 in which crystals are bound with one another at a high density, each crystal has a diameter between approximately 2 nm and 50 nm, and the shell portion has a width between approximately 20 nm and 100 nm in the extension direction. Moreover, in the columnar hollow crystal 5 surrounded by the shell portion 4, the hollow portion polycrystalline body 6 is formed with hollow portion polycrystalline body grains, which are bound with one another at a lower density. Since the crystal grains are present at a low density, the inside of the columnar crystal (hollow portion) 5 is in a hollow state. In some rare cases, there is observed a columnar hollow crystal, in which the above hollow portion polycrystalline body grains or the hollow portion polycrystalline body 6 consisting of an aggregate thereof are not formed. However, the ratio of such a columnar hollow crystal to the total columnar hollow crystals is extremely low. As the number of the hollow portion polycrystalline body grains and the hollow portion polycrystalline body 6 increases, a photocatalytic activity is enhanced. The diameter of the hollow portion polycrystalline body grain existing in the hollow portion 5 is between approximately 5 nm and 50 nm, and in general, the grain diameter is greater than that of the crystal grain constituting the above shell portion 4.

Figure 11:
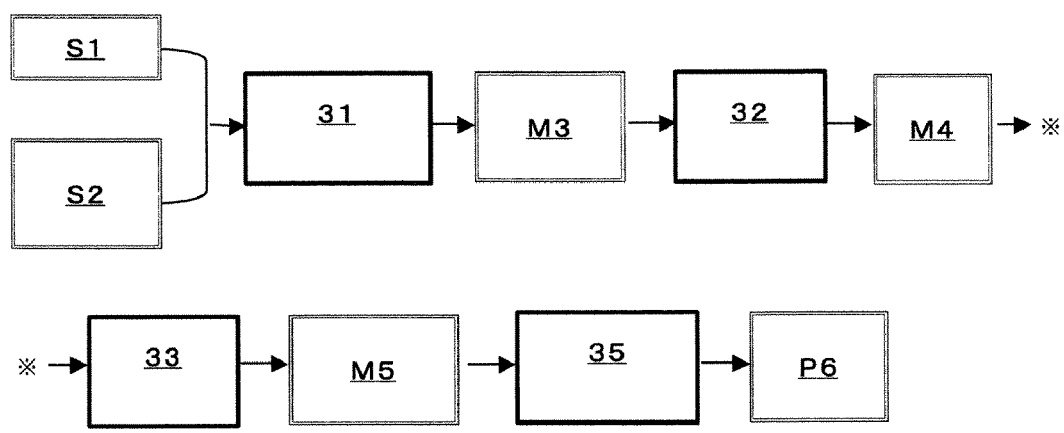
FIG. 11 is a flow diagram showing the method for producing a photocatalyst material of the present invention, which uses dry etching.

FIG. 11 is a flow diagram showing the method for producing a photocatalyst material of the present invention, which uses dry etching. In the figure, the present method comprises a gelation step 31 of immersing a substrate 1, to which a crystal nucleus S1 (2) used as a base portion 2 of a columnar photocatalyst basic structure 10 is fixed, in a sol solution S2 comprising an organic metallic compound or inorganic metallic compound, or applying the sol solution S2 comprising an organic metallic compound or inorganic metallic compound to the above crystal nucleus S1 (2) fixed to the above substrate 1, so as to obtain a prototype M3 of a photocatalyst material by gelation, a solidification step 32 of immobilizing (M4) the above prototype M3 obtained by the above gelation step 31 by drying, and a heat treatment step 33 of subjecting the immobilized prototype M4 to heat treatment so as to form a columnar photocatalyst crystalline body 3, and the method further comprises an interior-exposing structure forming step 35 of carrying out ion etching or other types of dry etching on the above columnar photocatalyst crystalline body M5 obtained by the above heat treatment step 33 to form an interior-exposing structure 8 to expose the structure of the inside of a crystal 5 on the surface of the columnar photocatalyst crystalline body 3, so that the photocatalyst material P6 (20) of the present invention is obtained (claim 17 in the scope of claims).

In the figure, the crystal nucleus S1 that is converted into the base portion 2 of the photocatalyst material P6 (20) by the gelation step 31 is immersed in the sol solution S2 containing an organic metallic compound or inorganic metallic compound, or the sol solution S2 containing an organic metallic compound or inorganic metallic compound is applied to the crystal nucleus S1 that is to be used as the base portion 2 of the photocatalyst material P6, so that the prototype M3 of the photocatalyst material is obtained by gelation. Thereafter, the prototype M3 obtained by the gelation step 31 is immobilized by drying in the solidification step 32, so as to obtain the immobilized prototype M4. Thereafter, the immobilized prototype M4 is subjected to heat treatment by the heat treatment step 33, so as to obtain the photocatalyst material M5 that has the columnar photocatalyst crystalline body 3 with a columnar hollow structure but does not have the interior-exposing structure 8. Thereafter, dry etching is carried out on the photocatalyst material M5 that does not have the interior-exposing structure by the interior-exposing structure forming step 35, so that the interior-exposing structure 8 to expose the structure of the inside of the crystal 5 is formed on the surface of the columnar photocatalyst crystalline body 3, thereby obtaining the photocatalyst material P6 (20) of the present invention.

That is to say, in order to expose the hollow portion 5 of the columnar hollow crystal to the surface, a part of the shell portion 4 should be eliminated. Dry etching is an effective method for eliminating it. Examples of available dry etching may include methods of physically cutting off a part of the shell portion 4 by ion bombardment with inert gas such as Ar (argon), Kr (krypton), Xe (xenon), or He (helium), that is, what is called ion etching or ion mealing. By such methods, a part of the shell portion 4 of the columnar hollow crystal 3 is physically eliminated, and the internal structure of the hollow portion 5 is exposed to the surface, so that a photocatalyst with a high activity can be achieved.

In addition, gas etching, which is carried out by plasma in activated gas, photolysis or pyrolysis, is another example of dry etching. It is confirmed that a part of the shell portion 4 is eliminated by the above gas etching also, and that a high photocatalytic activity can be achieved.

Figure 12:
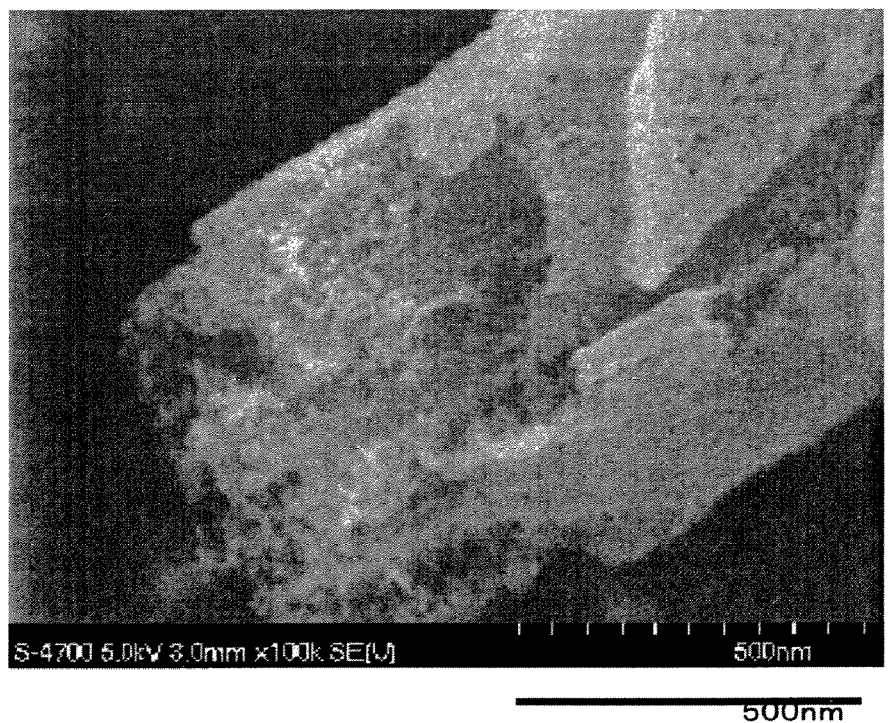
FIG. 12 is a scanning electron micrograph showing an example of the embodiments of the present invention, and the micrograph shows a structure to expose the internal structure of a columnar hollow crystal by dry etching.

FIG. 12 is a scanning electron micrograph showing an example of the embodiments of the present invention, and the micrograph shows an example of the state to expose the hollow portion 5 of the columnar hollow crystal of the photocatalyst material of the present invention obtained by the method for producing a photocatalyst material of the present invention including dry etching. In the figure, the state can be confirmed, in which apart of the shell portion of the columnar photocatalyst crystalline body constituting a columnar hollow crystal is eliminated, the structure of the hollow portion is exposed outside, and that the hollow portion polycrystalline body is formed at a low density.

Figure 13:
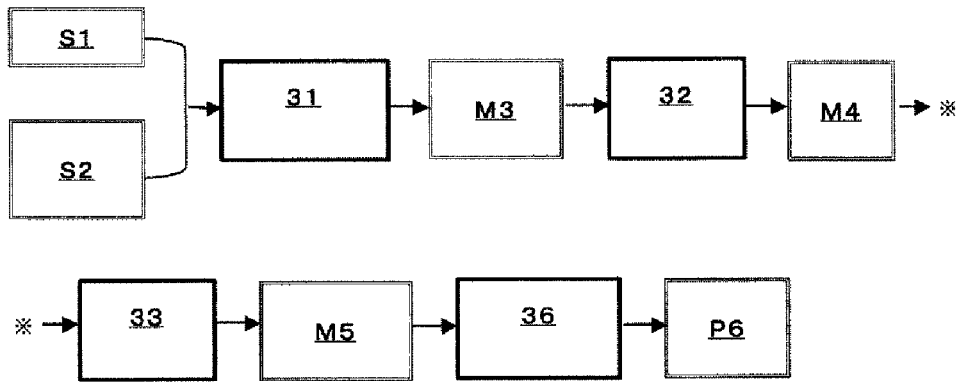
FIG. 13 is a flow diagram showing the method for producing a photocatalyst material of the present invention, which uses wet etching.

FIG. 13 is a flow diagram showing the method for producing a photocatalyst material of the present invention, which uses wet etching. In the figure, the production method comprises: a gelation step 31 of immersing a substrate 1, to which a crystal nucleus S1 (2) used as a base portion 2 of a columnar photocatalyst basic structure 10 is fixed, in a sol solution S2 comprising an organic metallic compound or inorganic metallic compound, or applying the sol solution S2 comprising an organic metallic compound or inorganic metallic compound to the above crystal nucleus S1 (2) fixed to the above substrate 1, so as to obtain a prototype M3 of a photocatalyst material by gelation; a solidification step 32 of immobilizing the above prototype M3 obtained by the above gelation step 31 by drying, so as to obtain an immobilized prototype M4; a heat treatment step 33 of subjecting the immobilized prototype M4 to heat treatment, so as to obtain a photocatalyst material M5 that has a columnar photocatalyst crystalline body 3 with a columnar hollow structure but does not have an interior-exposing structure 8; and an interior-exposing structure forming step 36 of carrying out wet etching on the photocatalyst material M5 not having the interior-exposing structure obtained by the above heat treatment step 33 so as to form the interior-exposing structure 8 to expose the structure of the inside of the crystal 5 to the surface of the columnar photocatalyst crystalline body 3, so that the photocatalyst material P6 of the present invention is obtained (claim 18 in the scope of claims).

In the figure, the crystal nucleus S1 that is converted into the base portion 2 of the photocatalyst material P6 (20) by the gelation step 31 is immersed in the sol solution S2 containing an organic metallic compound or inorganic metallic compound, or the above sol solution S2 is applied to the above crystal nucleus S1, so that the prototype M3 of the photocatalyst material is obtained by gelation. There after, the prototype M3 obtained by the gelation step 31 is immobilized by drying by the solidification step 32, so as to obtain the immobilized prototype M4. Thereafter, the immobilized prototype M4 is subjected to heat treatment by the heat treatment step 33, so as to obtain the photocatalyst material M5 that has the columnar photocatalyst crystalline body 3 with a columnar hollow structure but does not have the interior-exposing structure 8. Thereafter, wet etching is carried out on the photocatalyst material M5 that does not have the interior-exposing structure by the interior-exposing structure forming step 36, so that the interior-exposing structure 8 to expose the structure of the inside of the crystal 5 is formed on the surface of the columnar photocatalyst crystalline body 3, thereby obtaining the photocatalyst material P6 of the present invention.

That is to say, in order to expose the hollow portion 5 of the columnar hollow crystal 3 to the surface, a part of the shell portion 4 should be eliminated. Wet etching is an effective method for eliminating it. The wet etching uses an etching solution prepared based on strong inorganic acid, strong oxidizing agent, fluoride, or the like. A columnar hollow titanium oxide crystal is immersed in an etching solution that acts to dissolve titanium oxide, or the etching solution is applied to the columnar hollow titanium oxide crystal, so that a part of the shell portion 4 is dissolved and eliminated and that the structure of the hollow portion 5 is exposed to the surface, thereby achieving a high photocatalytic activity.

Figure 14:
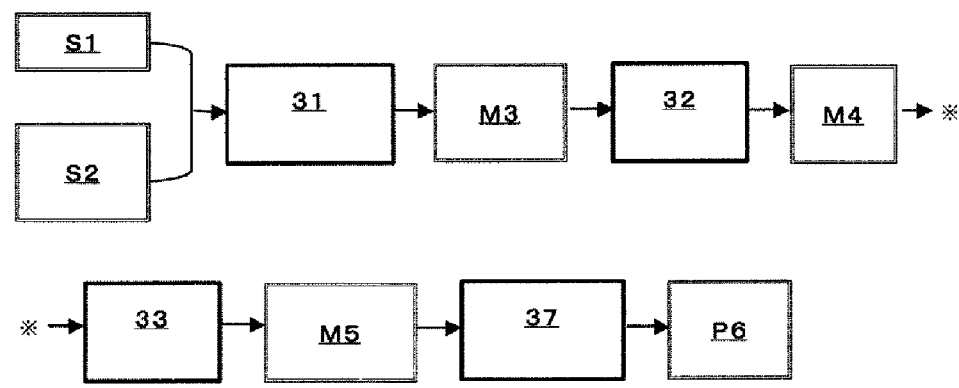
FIG. 14 is a flow diagram showing the method for producing a photocatalyst material of the present invention, which uses a mechanical method.

FIG. 14 is a flow diagram showing the method for producing a photocatalyst material of the present invention, which uses a mechanical method. In the figure, the production method of the present invention comprises: a gelation step 31 of immersing a substrate 1, to which a crystal nucleus S1 (2) used as a base portion 2 of a columnar photocatalyst basic structure 10 is fixed, in a sol solution S2 comprising an organic metallic compound or inorganic metallic compound, or applying the sol solution S2 comprising an organic metallic compound or inorganic metallic compound to the above crystal nucleus S1 (2) fixed to the above substrate 1, so as to obtain a prototype M3 of a photocatalyst material by gelation; a solidification step 32 of immobilizing the above prototype M3 obtained by the above gelation step 31 by drying, so as to obtain an immobilized prototype M4; a heat treatment step 33 of subjecting the immobilized prototype M4 to heat treatment, so as to obtain a photocatalyst material M5 that has a columnar photocatalyst crystalline body 3 with a columnar hollow structure but does not have an interior-exposing structure 8; and an interior-exposing structure forming step 37 of carrying out a polishing treatment or other treatments to mechanically eliminate a part of the above shell portion on the photocatalyst material M5 not having the interior-exposing structure obtained by the above heat treatment step 33 so as to form the interior-exposing structure 8 to expose the structure of the inside of the crystal 5 to the surface of the columnar photocatalyst crystalline body 3, so that the photocatalyst material P6 (20) of the present invention is obtained (claim 19 in the scope of claims).

In the figure, the crystal nucleus S1 that is converted into the base portion 2 of the photocatalyst material P6 (20) by the gelation step 31 is immersed in the sol solution S2 containing an organic metallic compound or inorganic metallic compound, or the above sol solution S2 is applied to the above crystal nucleus S1, so that the prototype M3 of the photocatalyst material is obtained by gelation. Thereafter, the prototype M3 obtained by the gelation step 31 is immobilized by drying by the solidification step 32, so as to obtain the immobilized prototype M4. Thereafter, the immobilized prototype M4 is subjected to heat treatment by the heat treatment step 33, so as to obtain the photocatalyst material M5 that has the columnar photocatalyst crystalline body 3 with a columnar hollow structure but does not have the interior-exposing structure 8. Thereafter, a polishing treatment or other treatments to mechanically eliminate a part of the above shell portion is carried out on the photocatalyst material M5 that does not have the interior-exposing structure by the interior-exposing structure forming step 37, so that the interior-exposing structure 8 to expose the structure of the inside of the crystal 5 is formed on the surface of the columnar photocatalyst crystalline body 3, thereby obtaining the photocatalyst material P6 (20) of the present invention.

That is to say, in order to expose the hollow portion 5 of the columnar hollow crystal 3 to the surface, a part of the shell portion 4 should be eliminated. Mechanical method is an effective method for eliminating it. The mechanical method is used herein to mean, for example, mechanical polishing of the shell portion 4 of the columnar hollow crystal. A part of the shell portion 4 is eliminated by polishing it, and so the structure of the hollow portion 5 is exposed to the surface, thereby achieving a high photocatalytic activity.

Figure 15:
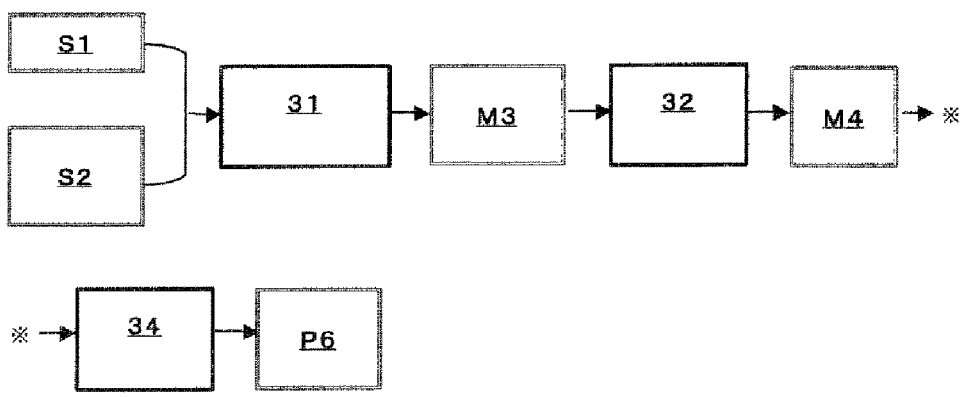
FIG. 15 is a flow diagram showing the method for producing a photocatalyst material of the present invention by controlling the heat treatment step.

FIG. 15 is a flow diagram showing the method for producing a photocatalyst material of the present invention by a controlling the heat treatment step. In the figure, the production method of the present invention comprises: a gelation step 31 of immersing a substrate 1, to which a crystal nucleus S1 (2) used as a base portion 2 of a columnar photocatalyst basic structure 10 is fixed, in a sol solution S2 comprising an organic metallic compound or inorganic metallic compound, or applying the sol solution S2 comprising an organic metallic compound or inorganic metallic compound to the above crystal nucleus S1 (2) fixed to the above substrate 1, so as to obtain a prototype M3 of a photocatalyst material by gelation; a solidification step 32 of immobilizing the above prototype M3 obtained by the above gelation step 31 by drying, so as to obtain an immobilized prototype M4; a heat treatment step 34 of subjecting the immobilized prototype M4 to heat treatment, so as to obtain a photocatalyst material that has a columnar photocatalyst crystalline body 3 with a columnar hollow structure. The present production method is characterized in that, in the above heat treatment step 34, heat treatment is carried out at a temperature increase rate of 15° C./min to 105° C./min to form an interior-exposing structure 8 to expose the structure of the inside of the crystal 5 to the surface of the columnar photocatalyst crystalline body 3, so that the photocatalyst material P6 (20) of the present invention is obtained. That is to say, the present production method is characterized in that the heat treatment step 34 serves also as an interior-exposing structure forming step (claim 20 in the scope of claims).

In the figure, the crystal nucleus S1 that is converted into the base portion 2 of the photocatalyst material P6 (20) by the gelation step 31 is immersed in the sol solution S2 containing an organic metallic compound or inorganic metallic compound, or the above sol solution S2 is applied to the above crystal nucleus S1 (2), so that the prototype M3 of the photocatalyst material is obtained by gelation. Thereafter, the prototype M3 obtained by the gelation step 31 is immobilized by drying by the solidification step 32, so as to obtain the immobilized prototype M4.

After the solidification step 32, the immobilized prototype M4 is heat processed by the heat treatment step 34 in which the temperature increase rate is set between 15° C./min and 105° C./min, and at the same time, an interior-exposing structure 8 to expose the structure of the inside of the crystal 5 is formed on the surface of the columnar photocatalyst crystalline body 3. Thus, the photocatalyst material P6 (20) of the present invention adopting a columnar hollow structure having the interior-exposing structure 8 can be obtained.

More desirably, after the solidification step 32, the immobilized prototype M4 is heat processed by the heat treatment step 34 in which the temperature increase rate is set between 20° C./min and 100° C./min, and at the same time, an interior-exposing structure 8 to expose the structure of the inside of the crystal 5 is formed on the surface of the columnar photocatalyst crystalline body 3. Thus, the photocatalyst material P6 (20) of the present invention adopting a columnar hollow structure having the interior-exposing structure 8 can be obtained.

The exposure of the structure of the hollow portion 5 by the above described dry etching, wet etching, or a mechanical method is achieved by carrying out an after-treatment after the preparation of the titanium oxide crystal with a columnar hollow structure. However, the exposure of the structure of the hollow portion 5 is realized also by controlling the preparation step of the titanium oxide crystal with a columnar hollow structure. That is, the present method for producing a photocatalyst material is characterized in its controlling the heat treatment step, which involves heat energy, an important factor in the formation of a crystal.

As stated above, the titanium oxide crystal with a columnar hollow structure is prepared by the sol-gel method in which an organic metallic compound or inorganic metallic compound is used. In the heat treatment step, control is given to a manner of evaporating a solvent and a residual organic matter derived from the previous treatment, so that the exposure of the structure of the hollow portion 5 is achieved. More specifically, in the heat treatment step, the temperature increase rate is set within the range between 15° C./min and 105° C./min, thereby realizing the above exposure. More desirably, the temperature increase rate is set within the range between 20° C./min and 100° C./min, thereby realizing the above exposure.

Generally, the heat treatment step of a columnar hollow titanium oxide crystal is carried out at a temperature increase rate of approximately 10° C./min. At this temperature increase rate, however, the shell portion 4 is formed at a high crystal density. Thus, in order to expose the structure of the hollow portion 5 outside, as described above, the above etching treatment is required.

However, if heat treatment is carried out at a temperature increase rate between 15° C./min and 105° C./min, and more desirably, at a temperature increase rate between 20° C./min and 100° C./min in the production process of the columnar hollow titanium oxide crystal, a solvent and a residual organic matter derived from the previous treatment is sharply evaporated, and thereby, the shell portion 4 is formed at a low crystal density. Accordingly, the shell portion 4 is opened, that is, the interior-exposing structure 8 is formed, so that the structure of the hollow portion 5 is exposed outside.

Even when the temperature increase rate in the heat treatment is faster than the above upper range, the shell portion 4 is formed at a low crystal density, and the structure of the hollow portion 5 is exposed. However, in this case, a rutile-type crystal structure causing the decrease of photocatalytic functions is mixed into an anatase-type crystal structure that is effective for the expression of the photocatalytic functions due to rapid heat conduction, and the effect of enhancing photocatalytic activity is thereby undesirably decreased.

Figure 16:
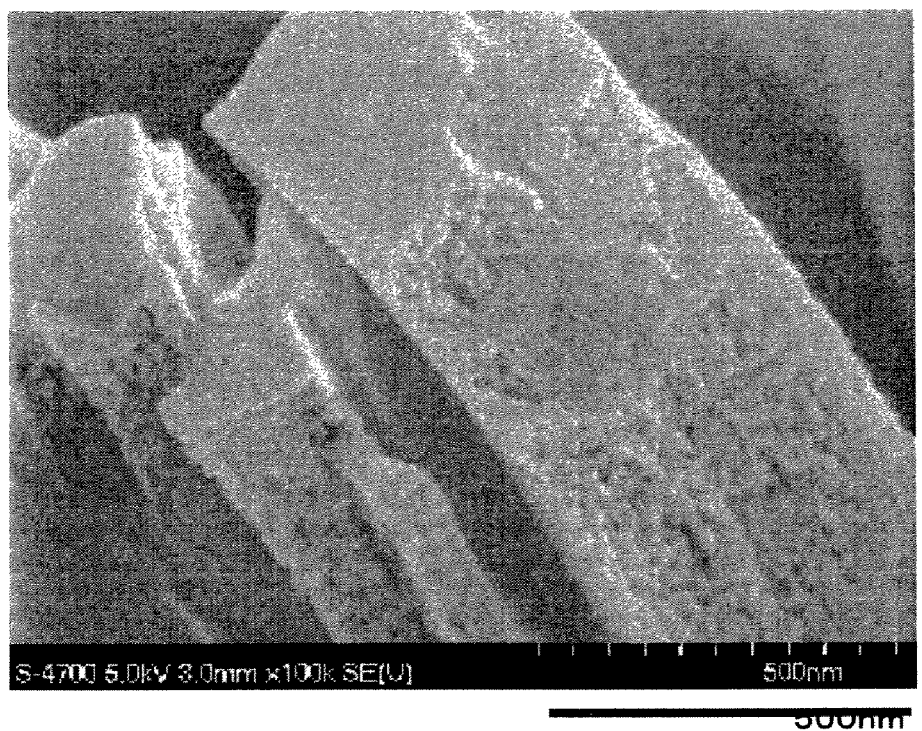
FIG. 16 is a scanning electron micrograph showing an example of the embodiments of the present invention, and the micrograph shows a structure to expose the internal structure of a columnar hollow crystal by a controlling the heat treatment step.

FIG. 16 is a scanning electron micrograph showing an example of the embodiments of the present invention, and the micrograph shows an example of the state in which the structure of the hollow portion 5 structure of a columnar hollow crystal obtained by a controlling the heat treatment step is exposed outside. In the figure, the state can be confirmed, in which the shell portion of the columnar photocatalyst crystalline body that is a columnar hollow crystal has a low crystal density and the structure of the hollow portion is therefore exposed outside, so that the internal crystal grains form a hollow portion polycrystalline body at a low density.

The above described titanium oxide photocatalyst material with a columnar hollow structure of the present invention has an extremely high activity. When a part of the shell portion 4 of the columnar hollow crystal is eliminated by dry etching, wet etching, or a mechanical method, and the structure of the hollow portion 5 in the columnar hollow crystal 3 is exposed outside, the photocatalytic activity can be further improved. Moreover, by controlling the temperature increase rate at 15° C./min to 105° C./min, and more desirably, at a temperature increase rate of 20° C./min to 100° C./min in the heat treatment step of the production of the columnar hollow titanium oxide crystal, the shell portion 4 is formed at a low crystal density, and the structure of the hollow portion 5 is thereby exposed outside, thereby realizing a high photocatalytic activity. When the photocatalyst material of the present invention is incorporated into a body of equipment together with a photocatalysis excitation light source such as ultraviolet light, and the air is then circulated inside, it decomposes malodorous or toxic substances, so that it can efficiently carry out the purification of the air. Moreover, it can also be applied to environmental purification devices directed towards water purification, deodorization, anti-bacterial action, or disinfection.

Examples (1)

Test results obtained in the following examples and comparative examples will be described below. It should be noted that in the following description, a "basal plate" may be denoted by "1", the same reference code as a substrate 1, and the "titanium oxide crystal with a columnar hollow structure" or "titanium oxide crystal" referring to the above term may be denoted by "3", the same reference code as a columnar photocatalyst crystalline body 3, at times.

A non-alkali glass (catalyst supporting area of 75 mm×75 mm) washed with a neutral detergent, isopropyl alcohol and pure water was used as a basal plate 1. On the surface of the basal plate 1, a crystal nucleus was placed in a sol solution containing an organic metallic compound, or the sol solution was applied to the crystal nucleus, followed by solidification and heat treatment, so as to form a titanium oxide crystal 3 with a columnar hollow structure on a crystal nucleus 2. The amount of the supported catalyst was approximately 0.1 g.

The sol solution containing an organic metallic compound was prepared as follows: 35 g of butanediol, 0.4 g of $H_2O$, and 0.5 g of nitric acid were mixed to prepare a solution, and while stirring, 5 g of titanium tetraisopropoxide (hereinafter referred to as "TTIP") was dropped into the solution, followed by stirring at ordinary temperature for 4 hours, so as to obtain a sol solution.

A crystal nucleus prepared by spray pyrolytic decomposition method (hereinafter referred to as "SPD method") was immersed in the thus obtained sol solution, or the sol solution prepared as above was applied to the crystal nucleus prepared by various production methods, followed by drying solidification and heat treatment, so that the titanium oxide crystal 3 was formed on the crystal nucleus. Solidification was carried out in a drier under conditions such as a reached temperature between 150° C. and 200° C. and a retention time of 2 hours. Heat treatment was carried out in an electric furnace under conditions such as a temperature increase rate of 10° C./min, a reached temperature between 500° C. and 600° C., and a retention time of 2 hours.

A method of preparing a crystalline titanium oxide film by SPD method is as follows: A material liquid was prepared by adding acetylacetone (hereinafter referred to as "Hacac") to TTIP at a molar ratio (Hacac/TTIP) of 1.0, diluting the mixture with isopropyl alcohol, and stirring it. Conditions for forming a film using a spray pyrolytic decomposition (SPD) device (YKII manufactured by Make) were a spraying pressure of 0.3 MPa, a spraying amount of 1.0 ml/sec, a spraying time of 0.5 ml once, a basal plate temperature of 45° C., and a spraying number of 200 times. The surface of the crystalline titanium oxide film prepared by SPD method was observed with a scanning electron microscope (hereinafter referred to as a "SEM"), and it was confirmed that the film consisted of crystals having a size of 30 nm to 100 nm.

From the thus obtained photocatalyst material having a titanium oxide columnar photocatalyst basic structure with a columnar hollow structure supported, a part of a shell portion 4 of the supported titanium oxide columnar photocatalyst basic structure with a columnar hollow structure was eliminated by ion etching and wet etching, so that the structure of a hollow portion 5 was exposed outside. Moreover, the exposure of the structure of the hollow portion 5 was carried out by a controlling the heat treatment step in the production of a columnar hollow titanium oxide crystal, setting the temperature increase rate of the above production conditions at 20° C./min to 100° C./min.

To evaluate photocatalytic functions, a test of the decomposition of a toxic substance, acetaldehyde, was carried out. First, the prepared titanium oxide photocatalyst material was placed in a 20 L glass vessel, and the atmosphere in the vessel was substituted with a controlled atmosphere (Nippon Sanso Corporation). Thereafter, the humidity in the vessel was adjusted to 60% to 65%, and 90.0% acetaldehyde gas (Wako Pure Chemical Industries, Ltd.) was poured into the vessel using a micro syringe to a concentration of 20 ppm. After it was left for 30 minutes to reach adsorption equilibrium, the titanium oxide photocatalyst material was irradiated with black light, and the time required for the concentration of acetaldehyde in the vessel to become 1 ppm or lower was measured using a gas monitor (1312-5 type manufactured by INNOVA). The distance between the sample and the black light was set to 20 mm, and the ultraviolet strength was set to 5,200 µW/cm². The surface of the prepared titanium oxide photocatalyst material was observed with a SEM.

Table 1 shows experimental conditions applied in each of Examples and Comparative Example.

TABLE 1

| | |
|---|---|
| #1 | Type of titanium oxide photocatalyst |
| #2 | Hollow portion exposing method |
| #3 | Treatment conditions |
| #4 | Example 1 |
| #5 | Example 2 |
| #6 | Example 3 |
| #7 | Example 4 |
| #8 | Example 5 |
| #9 | Example 6 |
| #10 | Comparative Example 1 |
| #11 | Columnar hollow titanium oxide photocatalyst Crystal nucleus: crystalline titanium oxide film (SPD method) |
| #12 | Powder photocatalyst |
| #13 | Ion etching |
| #14 | Wet etching |
| #15 | Control of temperature increase rate in heat treatment step |
| #16 | Pressure |
| #17 | Etching time |
| #18 | Etching solution |
| #19 | Heat treatment temperature |
| #20 | Temperature increase rate |
| #21 | Retention time |

In Example 1, a titanium oxide photocatalyst material with a columnar hollow structure was subjected to ion etching that is one type of dry etching. Ion etching was carried out using the etching mechanism of a batch sputtering system (SH-350EL-T06 manufactured by ULVAC Japan, Ltd.). Etching procedures are as follows: A basal plate on which a titanium oxide crystal with a columnar hollow structure was formed was placed in an etching chamber (in a film forming chamber). The atmosphere in the etching chamber was exhausted to 10 Pa with an oil rotary pump. Thereafter, the atmosphere was further exhausted with a turbo-molecular pump, so that the inside of the etching chamber was set to a predetermined degree of vacuum, $8 \times 10^{-4}$ Pa or lower. Thereafter, argon gas was introduced into the etching chamber, so that the atmosphere was set to an argon atmosphere. During this process, the flow of the introduced gas and the switching degree of the main valve were adjusted, so that the argon gas pressure (sputtering pressure) was set to 0.5 Pa to 10.0 Pa. Thereafter, using a radio-frequency source, electricity was discharged in the etching chamber, so as to carry out etching (The introduced argon atoms were ionized and accelerated by the electric discharge. The accelerated ionized argon atoms crash against the titanium oxide crystal with a columnar hollow structure that was the etching target, so that the shell portion 4 was destroyed). The etching treatment was carried out for 1 to 30 minutes. The surface of the thus obtained photocatalyst material was observed with a SEM, and it was confirmed that, as shown in FIG. 12, the material had a structure such that a part of the shell portion 4 of the columnar hollow crystal was eliminated.

In Example 2, a titanium oxide photocatalyst material with a columnar hollow structure was subjected to ion etching that is one type of dry etching. Ion etching was carried out using the etching mechanism of a sputtering system. Etching procedures are as follows: A basal plate on which a titanium oxide crystal with a columnar hollow structure was formed was placed in an etching chamber (in a film forming chamber). First, the atmosphere in the etching chamber was exhausted to 10 Pa with an oil rotary pump. Thereafter, the atmosphere was further exhausted to $10^{-4}$ Pa or lower with a turbo-molecular pump, so that the inside of the etching chamber was set to a predetermined degree of vacuum. Thereafter, argon gas was introduced into the etching chamber, so that the atmosphere was set to an argon atmosphere. During this process, the flow of the introduced gas and the switching degree of the main valve were adjusted, so that the argon gas pressure (sputtering pressure) was set to 0.5 Pa to 10.0 Pa. Thereafter, using a radio-frequency source, electricity was discharged in the etching chamber, so as to carry out etching. The introduced argon atoms were ionized and accelerated by the electric discharge. The accelerated ionized argon atoms crash against the titanium oxide crystal with a columnar hollow structure that was the etching target, so that apart of the shell portion 4 was destroyed. The etching treatment was carried out for 30 to 120 minutes. The surface of the thus obtained photocatalyst material was observed with a SEM, and it was confirmed that, as shown in FIG. 12, the material had a structure such that the shell portion 4 of the columnar hollow crystal was eliminated.

In Example 3, a titanium oxide photocatalyst material with a columnar hollow structure was subjected to wet etching. Wet etching was carried out using sulfuric acid (hereinafter referred to as "$H_2SO_4$") having an ability to dissolve titanium oxide. Etching procedures are as follows: A $H_2SO_4$ solution with a concentration of 1% to 20% was prepared, and a photocatalyst material comprising a titanium oxide crystal with a columnar hollow structure supported on a basal plate was immersed in the above solution. After immersing it in the solution for 1 to 24 hours, ultrasonic cleaning was carried out for 30 minutes using pure water, followed by drying at 150° C. for 2 hours. The surface of the thus obtained photocatalyst material was observed with a SEM, and it was confirmed that the photocatalyst material had a structure such that a part of the shell portion 4 of the columnar hollow crystal was eliminated.

In Example 4, a titanium oxide photocatalyst material with a columnar hollow structure was subjected to wet etching. Wet etching was carried out using sodium hydroxide (hereinafter referred to as "NaOH") having an ability to dissolve titanium oxide. Etching procedures are as follows: A NaOH solution with a concentration of 1% to 20% was prepared, and a photocatalyst material comprising a titanium oxide crystal with a columnar hollow structure supported on a basal plate was immersed in the above solution. After immersing it in the solution for 1 to 24 hours, ultrasonic cleaning was carried out for 30 minutes using pure water, followed by drying at 150° C. for 2 hours. The surface of the thus obtained photocatalyst material was observed with a SEM, and it was confirmed that the photocatalyst material had a structure such that a part of the shell portion 4 of the columnar hollow crystal was eliminated.

Example 5 shows the production of a titanium oxide crystal with a columnar hollow structure, wherein, in the heat treatment step, conditions for heat treatment were set as follows: a processing temperature between 500° C. and 600° C., a temperature increase rate between 20° C./min and 100° C./min, and a retention time of 2 hours. The surface of the thus obtained photocatalyst material was observed with a SEM, and it was confirmed that, as shown in FIG. 16, the photocatalyst material had a structure such that the shell portion 4 was formed at a low crystal density and the structure of the hollow portion 5 was exposed outside.

Example 6 shows the production of a titanium oxide crystal photocatalyst material with a columnar hollow structure without performing a treatment to expose the structure inside the columnar hollow crystal (hereinafter referred to as "hollow portion exposing treatment" at times) such as the above dry etching. Since the hollow portion exposing treatment was not carried out, when the surface of the obtained photocatalyst material was observed with a SEM, it was confirmed that the hollow portion of the columnar hollow crystal was not exposed outside.

Comparative Example 1 shows a commercially available powder photocatalyst material. (ST-01 manufactured by Ishihara Sangyo Kaisha Ltd.) The surface of the photocatalyst material was observed with a SEM, and it was confirmed that it consisted of titanium oxide particles having a grain diameter between approximately 5 nm and 30 nm.

The experimental results of the above examples and comparative example are shown in Table 2.

TABLE 2

| | |
|---|---|
| #1 | Results of surface observation (properties of crystal) |
| #2 | Time necessary to decompose acetaldehyde (time necessary to change the concentration from 20 ppm to 1 ppm or lower) |
| #3 | Example 1 |
| #4 | Example 2 |
| #5 | Example 3 |
| #6 | Example 4 |
| #7 | Example 5 |
| #8 | Example 6 |
| #9 | Comparative Example 1 |
| #10 | A large number of columnar hollow crystals were observed, in which outsidewall was eliminated and the hollow inside was thereby exposed outside. |
| #11 | A large number of columnar hollow crystals were observed, in which crystal density of outsidewall was low and the hollow inside was thereby exposed outside. |
| #12 | An aggregate consisting of columnar hollow crystals with a height of 3,000 nm to 5,000 nm and a width of 300 nm to 500 nm was observed, in which the hollow inside was not exposed. |
| #13 | A large number of titanium oxide particles with a grain diameter of 5 nm to 30 nm were observed. |

The results shown in Table 2 show the following:

The titanium oxide crystal photocatalyst material with a columnar hollow structure in Example 6, which was not subjected to a hollow portion exposing treatment, formed an aggregate consisting of columnar photocatalyst crystalline bodies that were columnar hollow crystals with a height of 3,000 nm to 5,000 nm and a width of 300 nm to 500 nm. It was also observed with a SEM that since the hollow portion exposing treatment was not carried out, the structure of the hollow portion of the columnar hollow crystal was not exposed outside. The time necessary to decompose acetaldehyde was 15 minutes. The decomposing ability of the photocatalyst material in Example 6 was higher than that in Comparative Example 1, which will be described later, and it showed a high photocatalytic activity.

With regard to a powder photocatalyst material in Comparative Example 1, it was observed with a SEM that a large number of titanium oxide particles with a grain diameter of 5 nm to 30 nm were present. The time necessary to decompose acetaldehyde was 28 minutes.

In contrast to the above Comparative Example 1, Examples 1 to 5 were titanium oxide crystal photocatalyst materials with a columnar hollow structure, in which the structure of the hollow portion was exposed outside by the above various hollow portion exposing treatments. The results of each example will be described in detail below.

In Example 1, a titanium oxide photocatalyst material with a columnar hollow structure was subjected to ion etching that is one type of dry etching. Ion etching was carried out under conditions such as an argon gas pressure (sputtering pressure) of 0.5 Pa to 10.0 Pa and an etching time of 1 to 30 minutes. The surface of the thus obtained photocatalyst material was observed with a SEM, and it was confirmed that, as shown in FIG. 12, the material had a structure such that a part of the shell portion of the columnar hollow crystal was eliminated and the structure of the hollow portion was exposed outside. The time necessary to decompose acetaldehyde was 9 minutes. Thus, the photocatalyst material in Example 1 had an extremely high decomposing ability and showed a high photocatalytic activity.

In Example 2, a titanium oxide photocatalyst material with a columnar hollow structure was subjected to ion etching that is one type of dry etching. Ion etching was carried out under conditions such as an argon gas pressure (sputtering pressure) of 0.5 Pa to 10.0 Pa and an etching time of 30 to 120 minutes. The surface of the thus obtained photocatalyst material was observed with a SEM, and it was confirmed that the material had a structure such that a part of the shell portion of the columnar hollow crystal was eliminated and the structure of the hollow portion was exposed outside. The time necessary to decompose acetaldehyde was 8 minutes. Thus, the photocatalyst material in Example 2 had an extremely high decomposing ability and showed a high photocatalytic activity.

In Example 3, a titanium oxide photocatalyst material with a columnar hollow structure was subjected to wet etching. Wet etching was carried out using $H_2SO_4$ having an ability to dissolve titanium oxide (solution concentration of 1% to 20%, immersion time of 1 to 24 hours). The surface of the thus obtained photocatalyst material was observed with a SEM, and it was confirmed that the material had a structure such that a part of the shell portion of the columnar hollow crystal was eliminated and the structure of the hollow portion was exposed outside. The time necessary to decompose acetaldehyde was 10 minutes. Thus, the photocatalyst material in Example 3 had an extremely high decomposing ability and showed a high photocatalytic activity.

In Example 4, a titanium oxide photocatalyst material with a columnar hollow structure was subjected to wet etching. Wet etching was carried out using NaOH having an ability to dissolve titanium oxide (solution concentration of 1% to 20%, immersion time of 1 to 24 hours). The surface of the thus obtained photocatalyst material was observed with a SEM, and it was confirmed that the material had a structure such that a part of the shell portion of the columnar hollow crystal was eliminated and the structure of the hollow portion was exposed outside. The time necessary to decompose acetaldehyde was 11 minutes. Thus, the photocatalyst material in Example 4 had an extremely high decomposing ability and showed a high photocatalytic activity.

In Example 5, a titanium oxide photocatalyst material with a columnar hollow structure was produced, while determining conditions for heat treatment as follows: a processing temperature of 500° C. to 600° C., a temperature increase rate of 20° C./min to 100° C./min, and a retention time of 2 hours. The surface of the thus obtained photocatalyst material was observed with a SEM, and it was confirmed that the material had a structure such that a part of the shell portion was formed at a low crystal density and the structure of the hollow portion 5 was exposed outside. The time necessary to decompose acetaldehyde was 8 minutes. Thus, the photocatalyst material in Example 5 had an extremely high decomposing ability and showed a high photocatalytic activity.

From the above results of Examples 1 to 5, it was confirmed that the exposure of the hollow portion of the titanium oxide crystal with a columnar hollow structure was effective for expression of a high photocatalytic activity. This may be because crystal grains with a size of 5 nm to 50 nm form a hollow polycrystalline body at a low density, which is present in the hollow portion 5. That is to say, the surface of a photocatalyst located inside, such as a hollow portion polycrystalline body that is an aggregate of crystals bound with one another at a low density, is exposed outside, so that the surface area of the photocatalyst contributing to the photocatalytic activity is increased, thereby achieving a high photocatalytic activity.

In each of the above Examples 1 to 5, a titanium oxide photocatalyst material with a columnar hollow structure to be subjected to a hollow portion exposing treatment was prepared using a sol solution containing an organic metallic compound. However, in the case of using a sol solution containing an inorganic metallic compound also, a titanium oxide crystal with a columnar hollow structure is prepared, and when the crystal is subjected to a hollow portion exposing treatment, a high photocatalytic activity is achieved. This has already been confirmed by experiments.

Moreover, dry etching, wet etching, and the control of a temperature increase rate in a heat treatment step are described herein as examples of a hollow portion exposing treatment. However, a mechanical method can also be applied. That is, the shell portion 4 of the columnar hollow crystal is polished, and a part thereof is eliminated. Thus, the structure of the hollow portion 5 is exposed outside, thereby achieving a high photocatalytic activity. This has already been confirmed by experiments.

Examples (2)

Changing the type of a crystal nucleus and conditions for a heat treatment step performed after a treatment with a sol solution (hereinafter referred to as "after being supported" at times), a titanium oxide photocatalyst material was prepared.

A titanium oxide photocatalyst material was produced in the same manner as in Examples (1) with the exceptions that crystal nucleuses produced by various types of production methods were used and that a reached temperature in the heat treatment step was set between 300° C. and 450° C., or 500° C. and 600° C., and the test of the decomposition of acetaldehyde was carried out. In addition, the analysis of the crystal structure of the photocatalyst in the above sample was carried out by X-ray diffraction. The surface of the photocatalyst was observed with a transmission electron microscope (hereinafter referred to as a "TEM") as well as a SEM.

Table 3 shows experimental conditions applied in each of examples and comparative examples.

TABLE 3

| #1 | Type of crystal nucleus |
| #2 | Conditions for preparation of photocatalyst material |
| #3 | Example 7 |
| #4 | Example 8 |
| #5 | Example 9 |
| #6 | Comparative Example 2 |
| #7 | Comparative Example 3 |
| #8 | Comparative Example 4 |
| #9 | Titanium oxide powder |
| #10 | Crystalline titanium oxide film produced by sputtering method |
| #11 | Crystalline titanium oxide film produced by spray pyrolytic deposition method |
| #12 | Drying temperature after loading of the sol solution |
| #13 | Heating temperature after loading of the sol solution |

In Example 7, a titanium oxide powder was used as a crystal nucleus.

To prepare the titanium oxide powder, a solution obtained by dissolving 7 g of TTIP (0.025 mol) in 50 ml of 1-propanol was slowly dropped in distilled water at ordinary temperature, while stirring. After dropping, the obtained solution was stirred for 1 hour and then subjected to vacuum filtration, followed by drying at 110° C. for day and night. The dry substance was crushed in a mortar, and the crushed substance was subjected to heat treatment at 600° C. for 2 hours in an electric furnace.

In Example 8, a crystalline titanium oxide crystal film produced by sputtering method was used as a crystal nucleus. A sol solution was applied onto the crystal film, so as to grow a titanium oxide crystal. Solidification was carried out at a reached temperature within a range between 150° C. and 200° C. and for a retention time of 2 hours. Heat treatment was carried out at a reached temperature within a range between 500° C. and 600° C. and for a retention time of 2 hours.

The method of preparing a crystal film by sputtering method is as follows: A substrate was placed in a film forming chamber such that it was placed opposite to a target. The distance between the substrate and the target was set to 90 mm. The atmosphere in the film forming chamber was exhausted to 20 Pa using a rotary pump (D-330DK manufactured by ULVAC Japan, Ltd.). Thereafter, the atmosphere in the film forming chamber was exhausted to a degree of vacuum of $8.0 \times 10^{-4}$ Pa or higher, using a turbo-molecular pump (TMP-550-L manufactured by Shimadzu Corporation). Thereafter, the substrate was heated to a predetermined temperature, and argon gas with a purity of 99.995% or more was introduced into the film forming chamber, so that the chamber was set to an argon gas atmosphere. During this process, the flow of the introduced gas and the switching degree of the main valve were adjusted, so that the chamber had a certain argon gas pressure (sputtering pressure). Thereafter, a high frequency was applied to the target using a radio-frequency source, so that a titanium oxide thin film was formed on the surface of the substrate. During this process, the substrate was rotated at a rotational speed of 3 rpm. Conditions for the film formation were as follows: an applied electric power of 1,500 W, a sputtering pressure of 10.0 Pa, a flow ratio between argon and oxygen of 20 sccm:20 sccm, a basal plate temperature of 250° C., and a time necessary to form the film of 3 hours. The surface of the obtained crystal film was observed, and it was confirmed that it consisted of crystals with a size of 10 nm to 60 nm.

In Example 9, a crystalline titanium oxide film produced by SPD method was used as a crystal nucleus. A sol solution was applied onto the crystal film, so as to grow a titanium oxide crystal. Conditions for solidification and heat treatment were the same as in Example 8.

The method of preparing a crystalline titanium oxide film by SPD method was the same as in Examples 1 to 6. The surface of the crystalline titanium oxide film obtained by SPD method was observed, and it was confirmed that it consisted of crystals with a size of 30 nm to 100 nm.

In Comparative Example 2, a crystalline titanium oxide film was produced under the same conditions as in Example 7 with the exception that the reached temperature in the heat treatment step was set between 300° C. and 450° C.

In Comparative Example 3, a crystalline titanium oxide film was prepared under the same conditions as in Example 8 with the exception that the reached temperature in the heat treatment step was set between 300° C. and 450° C. The surface of the obtained crystal film was observed, and it was confirmed that it consisted of crystals with a size of 10 nm to 60 nm.

In Comparative Example 4, a crystalline titanium oxide film was prepared under the same conditions as in Example 9 with the exception that the reached temperature in the heat treatment step was set between 300° C. and 450° C. The surface of the obtained crystalline titanium oxide film was observed, and it was confirmed that it consisted of crystals with a size of 30 nm to 100 nm.

The experimental results of the above examples and comparative examples are shown in Table 4.

TABLE 4

| # | |
|---|---|
| #1 | Structure of crystal |
| #2 | Form of crystal |
| #3 | Other results obtained from surface observation |
| #4 | Time necessary to decompose acetaldehyde (time necessary to change the concentration from 20 ppm to 1 ppm or lower) |
| #5 | Example 7 |
| #6 | Example 8 |
| #7 | Example 9 |
| #8 | Comparative Example 2 |
| #9 | Comparative Example 3 |
| #10 | Comparative Example 4 |
| #11 | Anatase |
| #12 | Columnar crystal with hollow portion |
| #13 | Columnar crystal with no hollow portion observed |
| #14 | End of extension direction closed |
| #15 | End of extension direction opened |

The results shown in Table 4 show the following:

In Comparative Examples 2, 3, and 4, a titanium oxide powder, a crystal film prepared by sputtering method, and a crystal film produced by SPD method were used as crystal nucleuses, respectively. All of these products were subjected to a heat treatment at a temperature between 300° C. and 450° C., so as to produce photocatalyst materials. The crystal structure of each of the obtained photocatalyst materials is anatase that is effective for photocatalytic functions, and all the photocatalyst materials require 30 minutes or more to decompose acetaldehyde. Moreover, although the form of the crystal was columnar, the hollow structure was not confirmed and the extension direction end of the columnar crystal was closed.

In Example 7, a titanium oxide powder was used as a crystal nucleus. The crystal nucleus was supported by a sol solution, and it was then subjected to solidification at a reached temperature between 150° C. and 200° C. for a retention time of 2 hours. Thereafter, a heat treatment was carried out at a temperature between 500° C. and 600° C. for a retention time of 2 hours. The crystal structure was anatase. The time necessary to decompose acetaldehyde was 15 minutes, and the obtained photocatalyst material showed an extremely high photocatalytic activity, as compared to those in Comparative Examples. In addition, the form of the crystal was columnar, and a hollow portion was formed inside the crystal. The extension direction end of the columnar crystal was closed.

In Example 8, a photocatalyst material was produced under the same conditions as in Example 7 with the exception that the crystalline titanium oxide film prepared by sputtering method was used as a crystal nucleus. The crystal structure was. The time necessary to decompose acetaldehyde was 10 minutes, and thus, the photocatalyst material obtained in the present example showed a photocatalytic activity higher than that in Example 7. In addition, the form of the crystal was columnar, and a hollow portion was formed inside the crystal. The extension direction end of the columnar crystal was opened.

In Example 9, a photocatalyst material was produced under the same conditions as in Example 7 with the exception that the crystalline titanium oxide film produced by SPD method was used as a crystal nucleus. The crystal structure was anatase. The time necessary to decompose acetaldehyde was 13 minutes, and thus, the photocatalyst material obtained in the present example showed a photocatalytic activity higher than that in Example 7. In addition, the form of the crystal was columnar, and a hollow portion was formed inside the crystal. The extension direction end of the columnar crystal was opened. In each of the above evaluation, it was confirmed by observing with a SEM that the inside of the columnar crystal had a hollow structure.

From the above Examples 7 to 9, it was confirmed that in order to express a high photocatalytic activity, it is effective that a photocatalyst crystal takes a columnar shape and that the columnar crystal has a hollow structure therein. Moreover, conditions for forming such a structure were determined.

Furthermore, it was also confirmed that when at least a part of the extension direction end of the columnar hollow crystal is opened without being covered with a shell portion, a much higher photocatalytic activity can be obtained.

Examples (3)

A photocatalyst material was produced using a sol solution containing an inorganic metallic compound. The sol solution containing an inorganic metallic compound was prepared as follows: 44 g of butanediol, 0.95 g of $H_2O$, and 0.4 g of nitric acid were mixed to prepare a solution, and while stirring, 5 g of titanium tetrachloride was dropped into the obtained solution, followed by stirring at ordinary temperature. Thereafter, a crystal nucleus prepared by various types of production method was immersed in the thus obtained sol solution, or the sol solution obtained as above was applied to the crystal nucleus prepared by various types of production method, followed by solidification and heat treatment, so that a titanium oxide crystal was formed on the crystal nucleus. Solidification was carried out in a drier under conditions such as a reached temperature of 150° C. and a retention time of 2 hours. Heat treatment was carried out in an electric furnace under conditions such as a temperature increase rate of 10° C./min, a reached temperature of 550° C., and a retention time of 2 hours. The test of the decomposition of acetaldehyde and the analysis of the crystal structure by X-ray diffraction were carried out in the same manner as in the above examples.

Table 5 shows experimental conditions applied in each of examples and comparative examples.

TABLE 5

| # | |
|---|---|
| #1 | Type of crystal nucleus |
| #2 | Conditions for preparation of photocatalyst material |
| #3 | Example 10 |
| #4 | Example 11 |
| #5 | Example 12 |
| #6 | Comparative Example 5 |
| #7 | Comparative Example 6 |
| #8 | Comparative Example 7 |
| #9 | Titanium oxide powder |
| #10 | Crystalline titanium oxide film produced by sputtering method |
| #11 | Crystalline titanium oxide film produced by spray pyrolytic decomposition method |
| #12 | Not used |
| #13 | Sol solution loaded |
| #14 | Sol solution not loaded |
| #15 | Sol solution containing inorganic metallic compound |
| #16 | Sol solution not loaded |

In Example 10, a titanium oxide powder was used as a crystal nucleus. The crystal nucleus was placed in the sol solution prepared as above, or the sol solution was applied to the crystal nucleus, so as to grow the crystal nucleus as described above. The preparation of the titanium oxide powder was carried out in the same manner as in Example 7.

In Example 11, a crystalline titanium oxide film produced by sputtering method was used as a crystal nucleus. The sol solution was applied onto the crystal film, so as to grow the crystalline titanium oxide. The crystal film was produced by sputtering method under the same conditions as in Example 8 with the exception that the temperature of a basal plate was set between 200° C. and 300° C. The surface of the produced crystal film was observed, and it was confirmed that the crystal film consisted of crystals with a size of 10 nm to 60 nm.

In Example 12, a crystalline titanium oxide film produced by SPD method was used as a crystal nucleus. The sol solution was applied onto the crystal film, so as to grow the crystalline titanium oxide. The crystalline titanium oxide film was produced by SPD method under the same conditions as in Example 9. The surface of the produced crystalline titanium oxide film was observed, and it was confirmed that the crystal film consisted of crystals with a size of 30 nm to 100 nm.

In Comparative Example 5, the sol solution not containing a crystal nucleus was applied onto a glass basal plate, so as to produce a titanium oxide photocatalyst material.

In Comparative Example 6, a titanium oxide photocatalyst material was produced in the same manner as in Example 11 with the exception that the crystal film was not supported by the sol solution.

In Comparative Example 7, a titanium oxide photocatalyst material was produced in the same manner as in Example 12 with the exception that the crystal film was not supported by the sol solution.

The experimental results of the above Examples and Comparative Examples are shown in Table 6.

TABLE 6

| # | |
|---|---|
| #1 | Structure of crystal |
| #2 | Form of crystal |
| #3 | Time necessary to decompose acetaldehyde (time necessary to change the concentration from 20 ppm to 1 ppm or lower) |
| #4 | Example 10 |
| #5 | Example 11 |
| #6 | Example 12 |
| #7 | Comparative Example 5 |
| #8 | Comparative Example 6 |
| #9 | Comparative Example 7 |
| #10 | Anatase |
| #11 | Columnar crystal |
| #12 | No columnar crystal formed |

The results shown in Table 6 show the following:

In Comparative Example 5 in which a sol solution without a crystal nucleus was applied to a glass basal plate to produce a titanium oxide crystal, the structure of the crystal was anatase that is effective for photocatalytic functions, and the time necessary to decompose acetaldehyde was 60 minutes. In Comparative Example 6 in which a crystalline titanium oxide film was produced by sputtering method and the crystal film was not supported by a sol solution, the crystal structure was anatase, and the time necessary to decompose acetaldehyde was 45 minutes. In Comparative Example 7 in which a crystalline titanium oxide film was produced by SPD method and the crystal film was not supported by a sol solution, the crystal structure was anatase, but it took 180 minutes to decompose acetaldehyde.

In Example 10, a crystal nucleus consisting of a titanium oxide powder was placed in a sol solution containing an inorganic metallic compound, and the sol solution was applied onto a basal plate, followed by solidification and heat treatment, so that a titanium oxide crystal was made to grow from the crystal nucleus. The crystal structure was anatase. As a result of observation with a SEM, it was confirmed that a columnar crystal was grown from the crystal nucleus. The time necessary to decompose acetaldehyde was 17 minutes, and the obtained crystal showed a photocatalytic activity higher than those in Comparative Examples.

In Example 11, a photocatalyst material was produced under the same conditions as in Example 10 with the exception that a crystalline titanium oxide film produced by sputtering method was used as a crystal nucleus. The crystal structure was anatase, and it was confirmed that a columnar crystal was grown from the crystal nucleus. The time necessary to decompose acetaldehyde was 16 minutes, and the obtained crystal showed a photocatalytic activity higher than those in Comparative Examples.

In Example 12, a photocatalyst material was produced under the same conditions as in Example 10 with the exception that a crystalline titanium oxide film produced by SPD method was used as a crystal nucleus. The crystal structure was anatase, and it was confirmed that a columnar crystal was grown from the crystal nucleus. The time necessary to decompose acetaldehyde was 18 minutes, and the obtained crystal showed a photocatalytic activity higher than those in Comparative Examples.

In each of the above Examples 10 to 12, titanium tetrachloride was used as an inorganic metallic compound. However, even when inorganic metallic compounds other than titanium tetrachloride, such as titanium sulfate or titanium oxysulfate are used, if conditions such as the preparation method of a sol solution, the concentration of the inorganic metallic compound, or the crystallization temperature are appropriately determined, a columnar crystal is formed from the crystal nucleus and it shows a high photocatalytic activity. This has already been confirmed by experiments.

Moreover, in each of the above examples, a titanium oxide powder, a crystal film produced by sputtering method, and a crystal film produced by spray pyrolytic decomposition method were used as crystal nucleuses. However, even when materials other than the above three types of materials, such as a single crystal, polycrystalline body, ceramic, thermally-oxidized metal film, anodically-oxidized metal film, or crystallized glass, are used as crystal nucleuses, a photocatalyst material with a high activity can be obtained. This has already been confirmed by experiments.

Furthermore, in each of the above examples, a non-alkali glass was used as a basal plate used for the formation of a crystal nucleus and the application of a sol solution. However, even when basal plates other than the non-alkali glass, such as a woven material, sponge-like material, or porous material produced by chemical cautery or machining are used, a photocatalyst material with a high activity can be obtained. This has already been confirmed by experiments.

Examples (4)

Photocatalyst materials were produced, changing the type of substrate.

A crystal nucleus to which a sol solution was applied was produced by sputtering method. The production was carried out in the same manner as in Example 8 with the exceptions that titanium metal with a target purity of 99.999% or more was used and that the temperature of a basal plate was set between 200° C. and 300° C. A sol solution containing an organic metallic compound was prepared as follows: 45 g of butanediol, 0.6 g of $H_2O$, and 0.4 g of nitric acid were mixed to obtain a solution, and while stirring, 5 g of TTIP was dropped into the obtained solution, followed by stirring at ordinary temperature for 4 hours, so as to prepare a sol solution.

The obtained sol solution was applied to the crystal nucleus produced by the above production method, followed by solidification and heat treatment, so that a titanium oxide crystal was formed on the crystal nucleus. Solidification was carried out under conditions such as a reached temperature in a drier of 150° C. and a retention time of 2 hours. Heat treatment was carried out in an electric furnace under conditions such as a temperature increase rate of 10° C./min, a reached temperature of 550° C. and a retention time of 2 hours. Using the thus obtained photocatalyst material as a sample, the above described test of the decomposition of acetaldehyde and analysis of the crystal structure of the photocatalyst by X-ray diffraction were carried out on the sample.

Table 7 shows experimental conditions applied in each of examples and comparative examples.

TABLE 7

| #1 | Type of crystal nucleus |
| #2 | Type of substrate |
| #3 | Example 13 |
| #4 | Example 14 |
| #5 | Example 15 |
| #6 | Example 16 |
| #7 | Example 17 |
| #8 | Comparative Example 8 |
| #9 | Comparative Example 9 |
| #10 | Crystalline titanium oxide film produced by sputtering method |
| #11 | Quartz glass cylindrical substrate with radius of 100 μm |
| #12 | Quartz glass cylindrical substrate with radius of 50 μm |
| #13 | Quartz glass cylindrical substrate with radius of 10 μm |
| #14 | Quartz glass cylindrical substrate with radius of 1 μm |
| #15 | Multiple laminated structure in Example 16 consisting of laminated substrates with radius of 1 μm |
| #16 | Quartz glass plate substrate |
| #17 | Non-alkali glass plate substrate |

In all of Examples 13 to 16, a cylindrical substrate made of quartz glass was used as a substrate, and a crystal nucleus was formed on a curved surface that is the perimeter of the substrate by sputtering method. A sol solution was applied to the crystal nucleus followed by drying solidification and heat treatment, so that a columnar titanium oxide crystal was allowed to grow, thereby producing a photocatalyst material. A substrate with a different radius was used in each example.

In Example 17, a multiple structure obtained by placing and laminating a large number of cylindrical substrates with a radius of 1 μm was used as a substrate, and a crystal nucleus was formed on a curved surface that is the perimeter of the substrate by sputtering method. A sol solution was applied to the crystal nucleus followed by drying solidification and heat treatment, so that a columnar titanium oxide crystal was allowed to grow, thereby producing a photocatalyst material.

A quartz glass with a size of 75 mm×75 mm was used as a substrate in Comparative Example 8, and a non-alkali glass with the same above size was used as a substrate in Comparative Example 9. In both examples, a crystal nucleus was formed on the surface of the substrate by sputtering method. Thereafter, a sol solution was applied to the crystal nucleus followed by drying solidification and heat treatment, so that a columnar titanium oxide crystal was allowed to grow, thereby producing a photocatalyst material.

The experimental results of the above examples and comparative examples are shown in Table 8.

TABLE 8

| #1 | Number of formed columnar crystals (number/cm$^2$) |
| #2 | Time necessary to decompose acetaldehyde (time necessary to change the concentration from 20 ppm to 1 ppm or lower) |
| #3 | Example 13 |
| #4 | Example 14 |
| #5 | Example 15 |
| #6 | Example 16 |
| #7 | Example 17 |
| #8 | Comparative Example 8 |
| #9 | Comparative Example 9 |

The results shown in Table 8 show the following:

In Comparative Example 8 in which a quartz glass plate was used as a substrate, the number of columnar crystals formed per unit area was 7,700, and the time necessary to decompose acetaldehyde was 30 minutes. In Comparative Example 9 in which a non-alkali glass plate was used as a substrate, the number of columnar crystals formed per unit area was 7,100, and the time necessary to decompose acetaldehyde was 33 minutes.

In Contrast, in each of Examples 13 to 16 in which a crystal film formed on the curved surface of a cylindrical substrate was used as a crystal nucleus and a sol solution was applied thereto, the number of columnar crystals formed per unit area was 10,000 or more, and thus, more columnar crystals were formed than in Comparative Examples. In particular, in Examples 14 to 16 in which substrates have a radius of 50 μm or shorter, the number of columnar crystals formed per unit area was 16,700 to 19,300, and thus, photocatalyst materials comprising columnar crystals formed at a high density were obtained.

In Example 17, the number of columnar crystals formed per unit area was 19,300, and the time necessary to decompose acetaldehyde was 12 minutes.

As stated above, it was found that it is preferable to use a substrate with a curved surface rather than a substrate with a flat surface to form columnar titanium oxide crystals with a high photocatalytic activity at a high density on the surface thereof. In addition, using a cylindrical substrate with a radius of 50 μm or shorter, columnar crystals were formed at a higher density. Accordingly, it became clear that a photocatalyst material with a high photocatalytic activity can be obtained, using a substrate with a multiple laminated structure obtained by laminating such cylindrical substrates.

In the above Examples 13 to 17, quartz glass was named as a material for the cylindrical substrate. However, even when glass such as non-alkali glass, ceramic, metal, or metal oxide is used, the same results can be obtained, which has already been confirmed by experiments.

In addition, in the above Examples 13 to 17, a sol solution containing an organic metallic compound was named as a sol solution applied to a crystal nucleus. However, even when a sol solution containing an inorganic metallic compound such as titanium tetrachloride, titanium sulfate or titanium oxysulfate is used, if conditions such as the preparation method of a sol solution, the concentration of the inorganic metallic compound, or the crystallization temperature are appropriately determined, a columnar crystal is formed from the crystal nucleus and it shows a high photocatalytic activity. This has already been confirmed by experiments.

INDUSTRIAL APPLICABILITY

The photocatalyst material of the present invention and a production method thereof are configured as described above. Accordingly, a photocatalyst material that can be used to achieve a photocatalyst with an excellent ability to adhere to a substrate and an extremely high photocatalytic activity can be provided. This is to say, the anti-bacterial function, the deodorizing function, the anti-fouling function, and other functions of a photocatalyst can be significantly enhanced.

Moreover, the photocatalyst material of the present invention has an interior-exposing structure, which exposes the hollow portion structure of a titanium oxide crystal with a columnar hollow structure and thereby increases the surface area of the crystal contributing to photocatalytic functions. Accordingly, the photocatalyst material of the present invention has a great effect to capture fine particles, bacteria or the like.

Furthermore, the photocatalyst material of the present invention has an extremely high photocatalytic activity. Accordingly, when the photocatalyst material is incorporated into a body of equipment together with a photocatalysis excitation light source such as ultraviolet light so as to make a device, it can be widely used for various types of air-conditioning equipment such as an air cleaner, deodorizing device or air-conditioning and heating device, or environmental purification devices such as a water cleaner or water-quality purifier. In particular, since the photocatalyst material of the present invention quickly and effectively decomposes malodorous ingredients existing in the air and other toxic substances, it can be used to achieve an unprecedented air cleaner with a high performance for both commercial and household use.

TABLE 1

|  | #1 | #2 | #3 |
|---|---|---|---|
| #4 | #11 | #13 | #16 #17 |
| #5 | #11 | #13 | #16 #17 |
| #6 | #11 | #14 | #18 #17 |

TABLE 1-continued

|  | #1 | #2 | #3 |
|---|---|---|---|
| #7 | #11 | #14 | #18 #17 |
| #8 | #11 | #15 | #19 #20 #21 |
| #9 | #11 | — | #19 #20 #21 |
| #10 | #12 | — | — |

TABLE 2

|  | #1 | #2 |
|---|---|---|
| #3 | #10 | 9 min |
| #4 | #10 | 8 min |
| #5 | #10 | 10 min |
| #6 | #10 | 11 min |
| #7 | #11 | 8 min |
| #8 | #12 | 15 min |
| #9 | #13 | 28 min |

TABLE 3

|  | #1 |  | #2 |
|---|---|---|---|
| #3 | #9 | #12 | #13 |
| #4 | #10 |  |  |
| #5 | #11 |  |  |
| #6 | #9 |  |  |
| #7 | #10 |  |  |
| #8 | #11 |  |  |

TABLE 4

|  | #1 | #2 | #3 | #4 |
|---|---|---|---|---|
| #5 | #11 | #12 | #14 | 15 min |
| #6 | #11 | #12 | #15 | 10 min |
| #7 | #11 | #12 | #14 | 13 min |
| #8 | #11 | #13 | #14 | 38 min |
| #9 | #11 | #13 | #14 | 30 min |
| #10 | #11 | #13 | #14 | 44 min |

TABLE 5

|  | #1 |  | #2 |
|---|---|---|---|
| #3 | #9 | #13 | #15 |
| #4 | #10 | #13 | #15 |
| #5 | #11 | #13 | #15 |
| #6 | #12 | #14 | #15 |
| #7 | #10 | #14 | #16 |
| #8 | #11 | #14 | #16 |

TABLE 6

|  | #1 | #2 | #4 |
|---|---|---|---|
| #4 | #10 | #11 | 17 min |
| #5 | #10 | #11 | 16 min |
| #6 | #10 | #11 | 18 min |
| #7 | #10 | #12 | 60 min |
| #8 | #10 | #12 | 45 min |
| #9 | #10 | #12 | 180 min |

TABLE 7

|  | #1 | #2 |
|---|---|---|
| #3 | #10 | #11 |
| #4 | #10 | #12 |
| #5 | #10 | #13 |
| #6 | #10 | #14 |
| #7 | #10 | #15 |
| #8 | #10 | #16 |
| #9 | #10 | #17 |

TABLE 8

|  | #1 | #2 |
|---|---|---|
| #3 | 11400 | — |
| #4 | 16700 | — |
| #5 | 18400 | — |
| #6 | 19300 | — |
| #7 | 19300 | 12 min |
| #8 | 7700 | 30 min |
| #9 | 7100 | 33 min |

TABLE 1

| | Type of titanium oxide photocatalyst | Hollow portion exposing method | Treatment conditions |
|---|---|---|---|
| Example 1 | Columnar hollow titanium oxide photocatalyst crystal nucleus: crystalline titanium oxide film(SPD method) | Ion etching | Pressure: 0.5~10.0 Pa Etching time: 1~30 min |
| Example 2 | Columnar hollow titanium oxide photocatalyst crystal nucleus: crystalline titanium oxide film(SPD method) | Ion etching | Pressure: 0.5~10.0 Pa Etching time: 30~120 min |
| Example 3 | Columnar hollow titanium oxide photocatalyst crystal nucleus: crystalline titanium oxide film(SPD method) | Wet etching | Etching solution: $H_2SO_4$1~20% Etching time: 1~24 hr |
| Example 4 | Columnar hollow titanium oxide photocatalyst crystal nucleus: crystalline titanium oxide film(SPD method) | Wet etching | Etching solution: NaOH1~20% Etching time: 1~24 hr |
| Example 5 | Columnar hollow titanium oxide photocatalyst crystal nucleus: crystalline titanium oxide film(SPD method) | Control of temperature increase rate in heat treatment step | Heat treatment temperature: 500~600° C. Temperature increase rate: 20° C./min~100 ° C./min Retention time: 2 hr |
| Example 6 | Columnar hollow titanium oxide photocatalyst crystal nucleus: crystalline titanium oxide film(SPD method) | — | temperature: 500~600° C. Temperature increase rate: 10° C./min Retention time: 2 hr |
| Comparative Example 1 | Powder photocatalyst | — | — |

TABLE 2

| | Results of surface observation (properties of crystal) | Time necessary to decompose acetaldehyde (time necessary to change the concentration from 20 ppm to 1 ppm or lower) |
|---|---|---|
| Example 1 | A large number of columnar hollow crystals were observed, in which outsidewall was eliminated and the hollow inside was thereby exposed outside. | 9 min |
| Example 2 | A large number of columnar hollow crystals were observed, in which outsidewall was eliminated and the hollow inside was thereby exposed outside. | 8 min |
| Example 3 | A large number of columnar hollow crystals were observed, in which outsidewall was eliminated and the hollow inside was thereby exposed outside. | 10 min |
| Example 4 | A large number of columnar hollow crystals were observed, in which outsidewall was eliminated and the hollow inside was thereby exposed outside. | 11 min |
| Example 5 | A large number of columnar hollow crystals were observed, in which crystal density of outsidewall was low and the hollow inside was thereby exposed outside. | 8 min |
| Example 6 | An aggregate consisting of columnar hollow crystals with a height of 3,000 nm to 5,000 nm and a width of 300 nm to 500 nm was observed, in which the hollow inside was not exposed. | 15 min |
| Comparative Example 1 | A large number of titanium oxide particles with a grain diameter of 5 nm to 30 nm were observed. | 28 min |

TABLE 3

| | Type of crystal nucleus | Conditions for preparation of photocatalyst material | |
|---|---|---|---|
| Example 7 | Titanium oxide powder | Drying temperature after loading of the sol solution 150~200(° C.) | Heating temperature after loading of the sol solution 500~600(° C.) |
| Example 8 | Crystalline titanium oxide film produced by sputtering method | Drying temperature after loading of the sol solution 150~200(° C.) | Heating temperature after loading of the sol solution 500~600(° C.) |
| Example 9 | Crystalline titanium oxide film produced by spray pyrolytic decomposition method | Drying temperature after loading of the sol solution 150~200(° C.) | Heating temperature after loading of the sol solution 500~600(° C.) |
| Comparative Example 2 | Titanium oxide powder | Drying temperature after loading of the sol solution 150~200(° C.) | Heating temperature after loading of the sol solution 300~450(° C.) |
| Comparative Example 3 | Crystalline titanium oxide film produced by sputtering method | Drying temperature after loading of the sol solution 150~200(° C.) | Heating temperature after loading of the sol solution 300~450(° C.) |
| Comparative Example 4 | Crystalline titanium oxide film produced by spray pyrolytic decomposition method | Drying temperature after loading of the sol solution 150~200(° C.) | Heating temperature after loading of the sol solution 300~450(° C.) |

TABLE 4

| | Structure of crystal | Form of crystal | Other results obtained from surface observation | Time necessary to decompose acetaldehyde (time necessary to change the concentration from 20 ppm to 1 ppm or lower) |
|---|---|---|---|---|
| Example 7 | Anatase | Columnar crystal with hollow portion | End of extension direction closed | 15 min |
| Example 8 | Anatase | Columnar crystal with hollow portion | End of extension direction opened | 10 min |
| Example 9 | Anatase | Columnar crystal with hollow portion | End of extension direction closed | 13 min |
| Comparative Example 2 | Anatase | Columnar crystal with no hollow portion observed | End of extension direction closed | 38 min |
| Comparative Example 3 | Anatase | Columnar crystal with no hollow portion observed | End of extension direction closed | 30 min |
| Comparative Example 4 | Anatase | Columnar crystal with no hollow portion observed | End of extension direction closed | 44 min |

TABLE 5

| | Type of crystal nucleus | Conditions for preparation of photocatalyst material | |
|---|---|---|---|
| Example 10 | Titanium oxide powder | Sol solution loaded | Sol solution containing inorganic metallic compound |
| Example 11 | Crystalline titanium oxide film produced by sputtering method | Sol solution loaded | Sol solution containing inorganic metallic compound |
| Example 12 | Crystalline titanium oxide film produced by spray pyrolytic decomposition method | Sol solution loaded | Sol solution containing inorganic metallic compound |
| Comparative Example 5 | Not used | Sol solution not loaded | Sol solution containing inorganic metallic compound |
| Comparative Example 6 | Crystalline titanium oxide film produced by sputtering method | Sol solution not loaded | Sol solution not loaded |
| Comparative Example 7 | Crystalline titanium oxide film produced by spray pyrolytic decomposition method | Sol solution not loaded | Sol solution not loaded |

TABLE 6

| | Structure of crystal | Form of crystal | Time necessary to decompose acetaldehyde (time necessary to change the concentration from 20 ppm to 1 ppm or lower) |
|---|---|---|---|
| Example 10 | Anatase | Columnar crystal | 15 min |
| Example 11 | Anatase | Columnar crystal | 10 min |
| Example 12 | Anatase | Columnar crystal | 13 min |
| Comparative Example 5 | Anatase | No columnar crystal formed | 38 min |
| Comparative Example 6 | Anatase | No columnar crystal formed | 30 min |
| Comparative Example 7 | Anatase | No columnar crystal formed | 44 min |

TABLE 7

| | Type of crystal nucleus | Type of substrate |
|---|---|---|
| Example 13 | Crystalline titanium oxide film produced by sputtering method | Quartz glass cylindrical substrate with radius of 100 μm |

TABLE 7-continued

| | Type of crystal nucleus | Type of substrate |
|---|---|---|
| Example 14 | Crystalline titanium oxide film produced by sputtering method | Quartz glass cylindrical substrate with radius of 50 μm |
| Example 15 | Crystalline titanium oxide film produced by sputtering method | Quartz glass cylindrical substrate with radius of 10 μm |
| Example 16 | Crystalline titanium oxide film produced by sputtering method | Quartz glass cylindrical substrate with radius of 1 μm |
| Example 17 | Crystalline titanium oxide film produced by sputtering method | Multiple laminated structure in Example 16 consisting of laminated substrate with radius of 1 μm |
| Comparative Example 8 | Crystalline titanium oxide film produced by sputtering method | Quartz glass plate substrate |
| Comparative Example 9 | Crystalline titanium oxide film produced by sputtering method | Non-alkali glass plate substrate |

TABLE 8

| | Number of formed columnar crystals (number/cm$^2$) | Time necessary to decompose acetaldehyde (time necessary to change the concentration from 20 ppm to 1 ppm or lower) |
|---|---|---|
| Example 13 | 11400 | — |
| Example 14 | 16700 | — |
| Example 15 | 18400 | — |
| Example 16 | 19300 | — |
| Example 17 | 19300 | 12 min |
| Comparative Example 8 | 7700 | 30 min |
| Comparative Example 9 | 7100 | 33 min |

The invention claimed is:

1. A method for producing a photocatalyst material, characterized in that more than one columnar photocatalyst basic structure is fixed to the surface of a substrate, said columnar photocatalyst basic structure consisting of a base portion comprising crystal nuclei that are fixed to the surface of the substrate, and a columnar photocatalyst crystalline body that connects to and is extended from the base portion and has a columnar structure having a hollow portion formed therein, and said columnar structure is quadra prismatic, said base portion consists of crystal nuclei and the photocatalyst constituting said columnar photocatalyst crystalline body is titanium oxide, said columnar photocatalyst crystalline body is formed by a shell portion consisting of a sidewall and an extension direction end and has a columnar shape such that a hollow portion is surrounded by said shell portion, wherein said shell portion is a polycrystalline body consisting of aggregated photocatalyst crystal grains, an aggregate of photocatalyst crystal grains in the hollow portion that is formed inside said columnar photocatalyst crystalline body, and the shell portion of said columnar photocatalyst crystalline body has an interior-exposing structure to expose an internal structure that is the hollow portion of said columnar photocatalyst crystalline body, the method comprises:

a gelation step of immersing a substrate, to which crystal nuclei are fixed for use as a base portion of a columnar photocatalyst basic structure, in a sol solution comprising an organic metallic compound or inorganic metallic compound, or applying the sol solution comprising an organic metallic compound or inorganic metallic compound to said crystal nuclei fixed to said substrate, so as to obtain a prototype of a photocatalyst material by gelation;

a solidification step of drying and solidifying said prototype obtained by said gelation step; and a heat treatment step of subjecting the solidified prototype to heat treatment so as to form a columnar photocatalyst crystalline body, so that a photocatalyst material is obtained, and said columnar photocatalyst basic structure is quadra prismatic and having a hollow portion formed therein.

2. A method for producing a photocatalyst material according to claim 1, characterized in that said gelation step is:

of using a substrate whose surface to which said base portion is to be fixed is a curved surface convex on the side of the extension direction of said columnar photocatalyst crystalline body, or a cylindrical substrate having a radius of 50 gm or shorter, fixing crystal nuclei for use as said base portion of said columnar photocatalyst basic structure to said substrate, immersing the substrate, to which said crystal nuclei are fixed, in a sol solution comprising an organic metallic compound or inorganic metallic compound, or applying the sol solution comprising an organic metallic compound or inorganic metallic compound to said crystal nuclei fixed to said substrate, so as to obtain a prototype of a photocatalyst material by gelation.

3. A method for producing a photocatalyst material according to claim 1, characterized in that ion etching or other types of dry etching is carried out on said columnar photocatalyst crystalline body obtained by said heat treatment step;

wet etching in which said columnar photocatalyst crystalline body is treated with an etching solution that acts to dissolve titanium oxide is carried out on said columnar photocatalyst crystalline body obtained by said heat treatment step; or a polishing treatment or other treatments to mechanically eliminate a part of said shell portion is carried out on said columnar photocatalyst crystalline body obtained by said heat treatment step, so as to obtain the photocatalyst aterial with the shell portion having said interior-exposing structure.

4. A method for producing a photocatalyst material according to claim 1, characterized in that, in said heat treatment step, heat treatment is carried out at a temperature increase rate of from 15° C./min to 105° C./min, so as to obtain the photocatalyst material.

* * * * *